(12) United States Patent
Suzuki

(10) Patent No.: US 9,569,810 B2
(45) Date of Patent: Feb. 14, 2017

(54) APPARATUS AND METHOD FOR EMBEDDING DATA IN OBJECT AND APPARATUS AND METHOD FOR EXTRACTING EMBEDDED DATA

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Tomohisa Suzuki, Kanagawa (JP)

(73) Assignees: KABUSHIKI KAISHA TOSHIBA, Tokyo (JP); TOSHIBA SOLUTIONS CORPORATION, Kanagawa (JP)

( * ) Notice: Subject to any disclaimer, the term of this patent is extended or adjusted under 35 U.S.C. 154(b) by 83 days.

(21) Appl. No.: 14/589,320

(22) Filed: Jan. 5, 2015

(65) Prior Publication Data
US 2015/0110342 A1 Apr. 23, 2015

Related U.S. Application Data

(63) Continuation of application No. PCT/JP2012/067225, filed on Jul. 5, 2012.

(51) Int. Cl.
*G06K 9/18* (2006.01)
*G06K 9/48* (2006.01)
(Continued)

(52) U.S. Cl.
CPC ........... *G06T 1/0021* (2013.01); *G06T 1/0028* (2013.01); *G06T 11/203* (2013.01);
(Continued)

(58) Field of Classification Search
None
See application file for complete search history.

(56) References Cited

U.S. PATENT DOCUMENTS

| 2003/0058480 A1 | 3/2003 | Miyake et al. |
| 2007/0228168 A1 | 10/2007 | Suzuki et al. |
| 2008/0304839 A1 | 12/2008 | Okamoto et al. |

FOREIGN PATENT DOCUMENTS

| CN | 101207680 | 6/2008 |
| CN | 102087736 | 6/2011 |

(Continued)

OTHER PUBLICATIONS

International Search Report for PCT/JP2012/067225 mailed on Sep. 25, 2012.
(Continued)

*Primary Examiner* — Randolph I Chu
(74) *Attorney, Agent, or Firm* — Amin, Turocy & Watson LLP

(57) ABSTRACT

According to an embodiment, a data embedding apparatus includes a data acquisition unit and an object generation unit. The data acquisition unit acquires first data formed from a first bit string to be embedded in a first object including a first line segment or a first curve. The object generation unit generates a second object, which includes a deformed line segment or a deformed curve having a displacement corresponding to the first bit string with respect to the first line segment or the first curve and in which the first data is embedded, by deforming at least one of the first line segment and the first curve of the first object based on the first bit string.

8 Claims, 21 Drawing Sheets

(51) Int. Cl.
*G06T 1/00* (2006.01)
*G06T 11/20* (2006.01)
*H04N 1/32* (2006.01)

(52) U.S. Cl.
CPC ... *H04N 1/32229* (2013.01); *G06T 2201/005* (2013.01); *G06T 2201/0051* (2013.01)

(56) References Cited

FOREIGN PATENT DOCUMENTS

| | | | |
|---|---|---|---|
| JP | 07-254037 | | 10/1995 |
| JP | 2002-094768 | | 3/2002 |
| JP | 2003-101762 | | 4/2003 |
| JP | 2006-259795 | | 9/2006 |
| JP | 2007-194934 | | 8/2007 |
| JP | 2010-098721 | * | 4/2010 |

OTHER PUBLICATIONS

International Preliminary Report on Patentability for International Patent Application No. PCT/JP2012/067225 mailed Jan. 6, 2015.
Written Opinion for International Patent Application No. PCT/JP2012/067225 mailed Sep. 25, 2015.
Chinese Office Action for Chinese Patent Application No. 201280074313.0 mailed on Aug. 4, 2016.

* cited by examiner

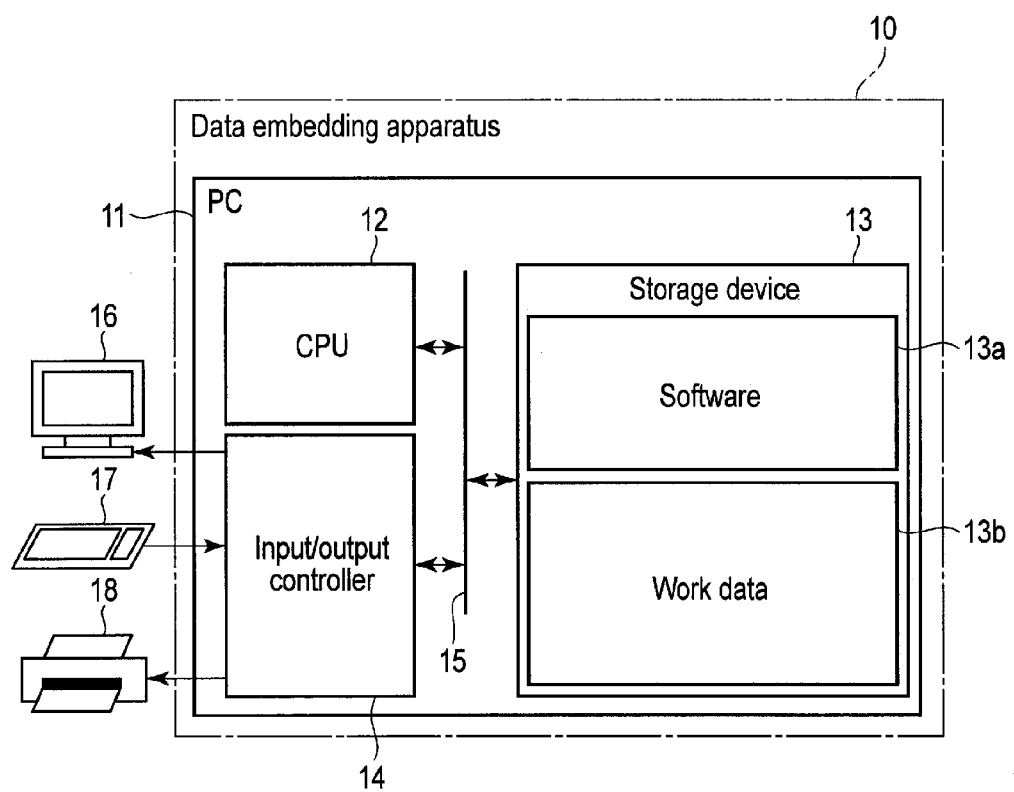
F I G. 1

De ～ 0 1 0 0 1 1 0 1
w ～ ( -1, +1, -1, -1, +1, +1, -1, +1 ) ～30
F I G. 3
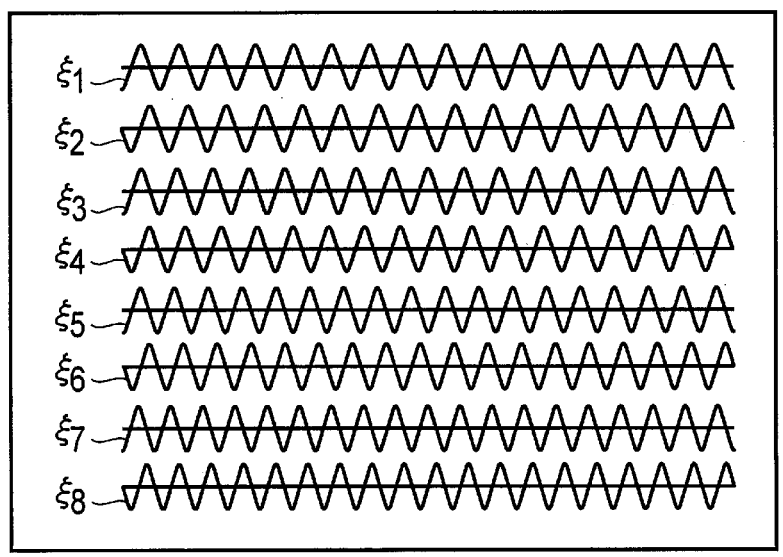
F I G. 4
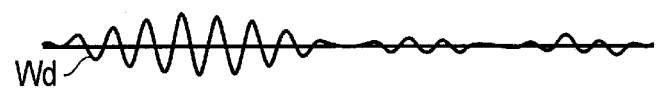
F I G. 5

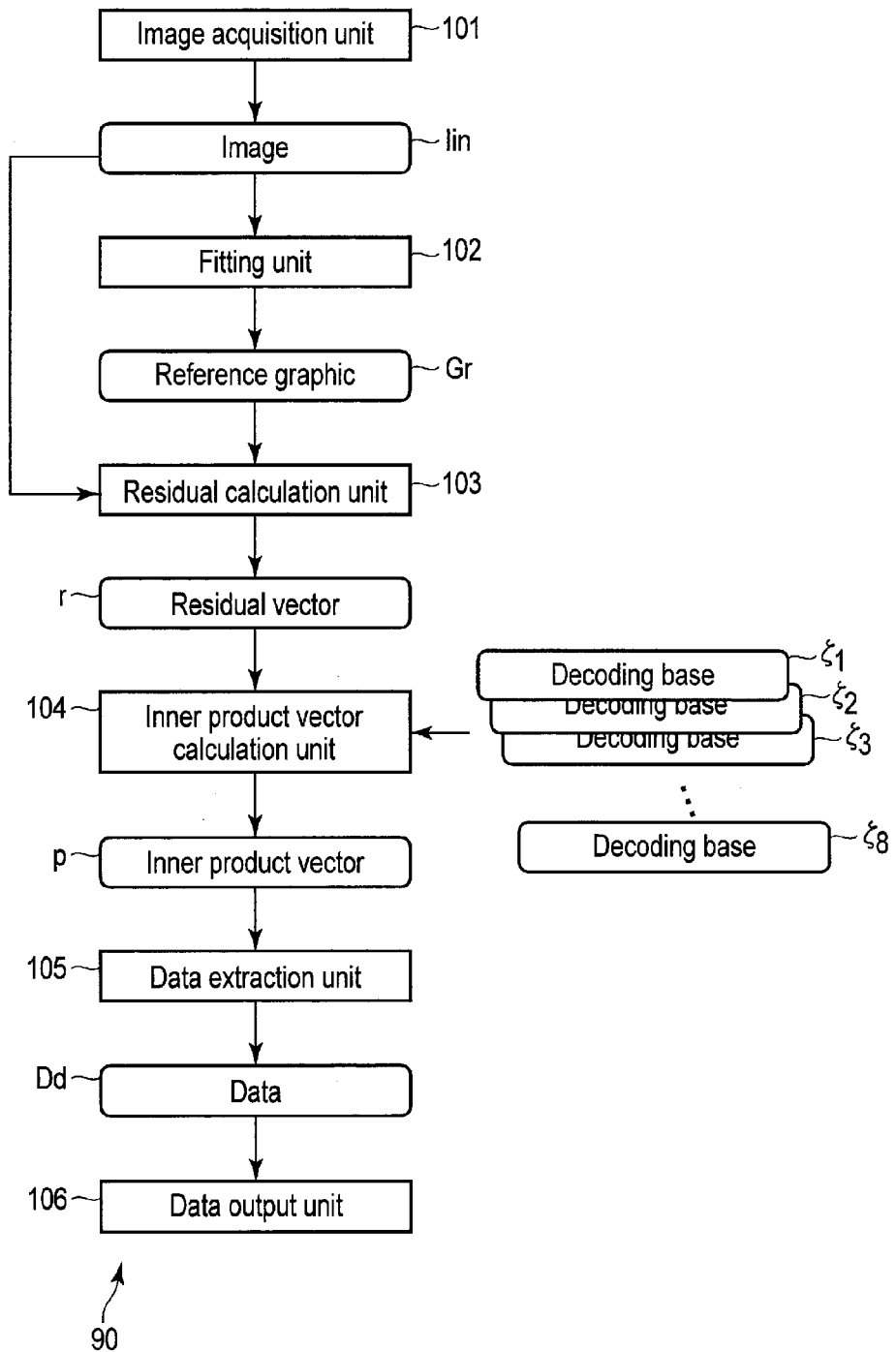
F I G. 10

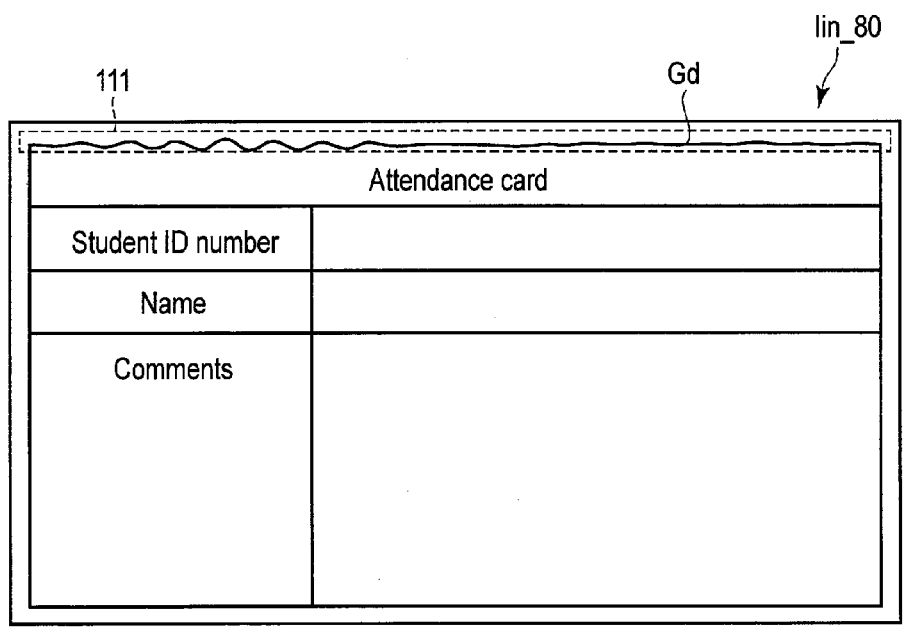
F I G. 11
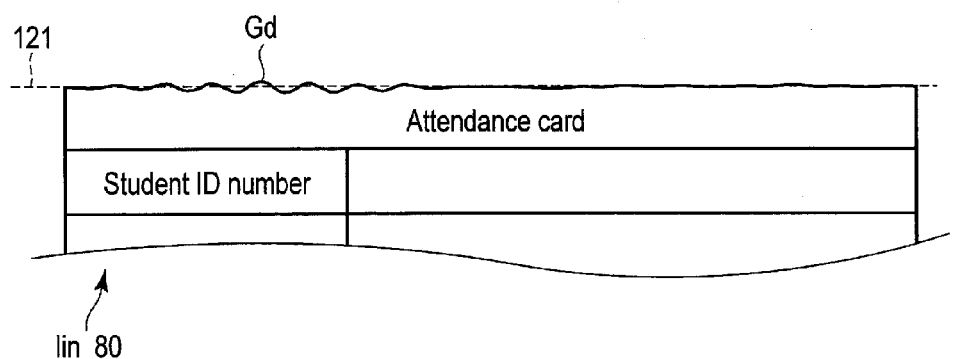
F I G. 12

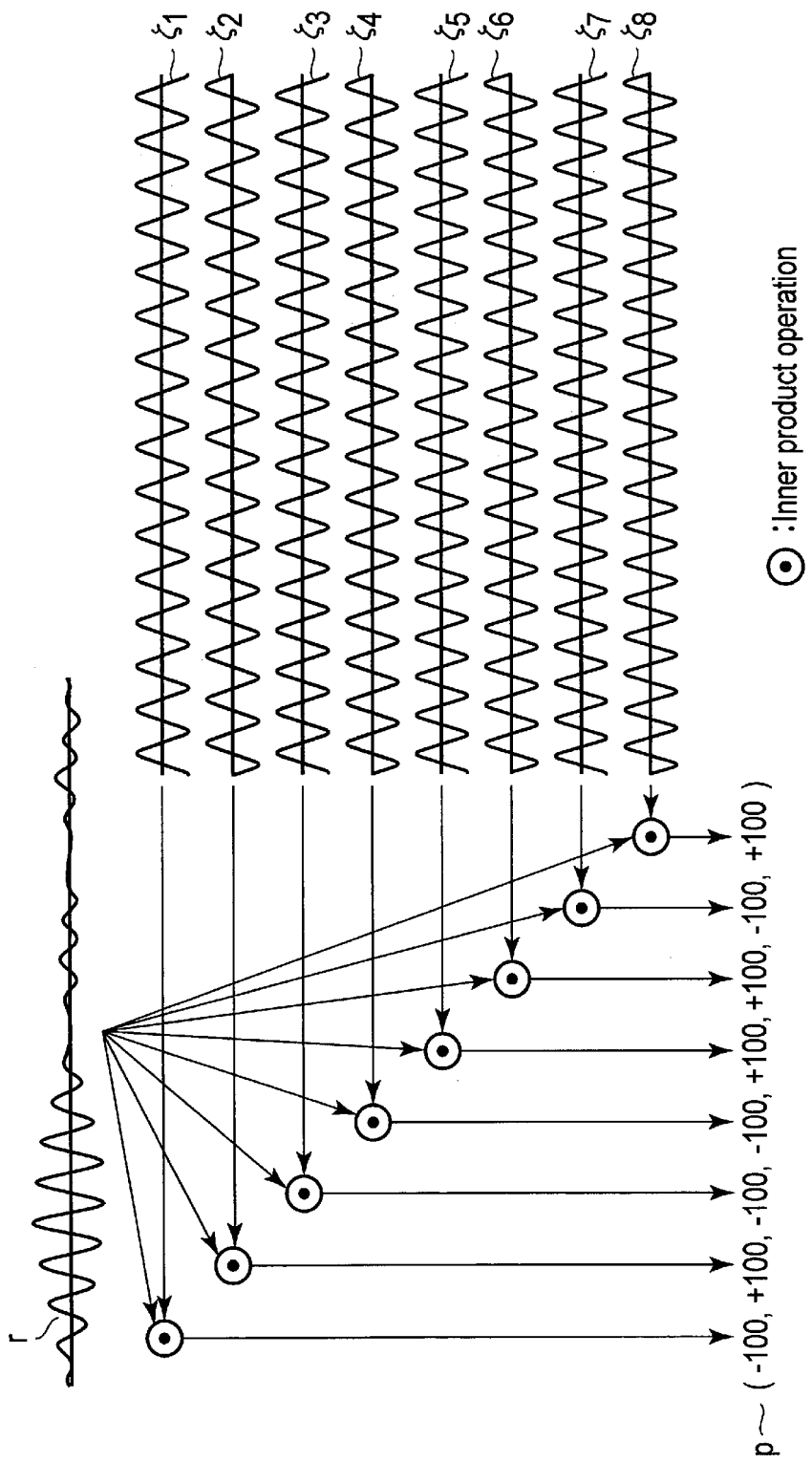
F I G. 15

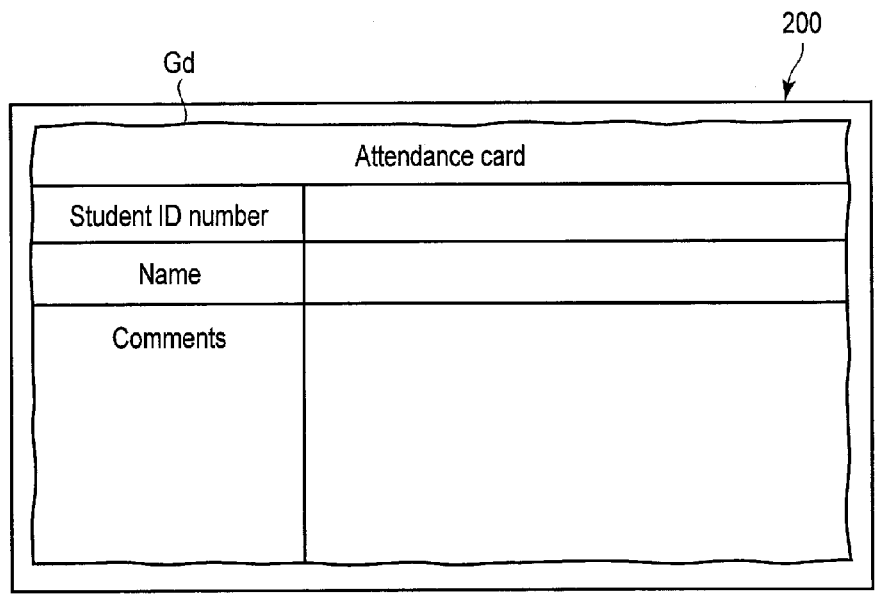
F I G. 20
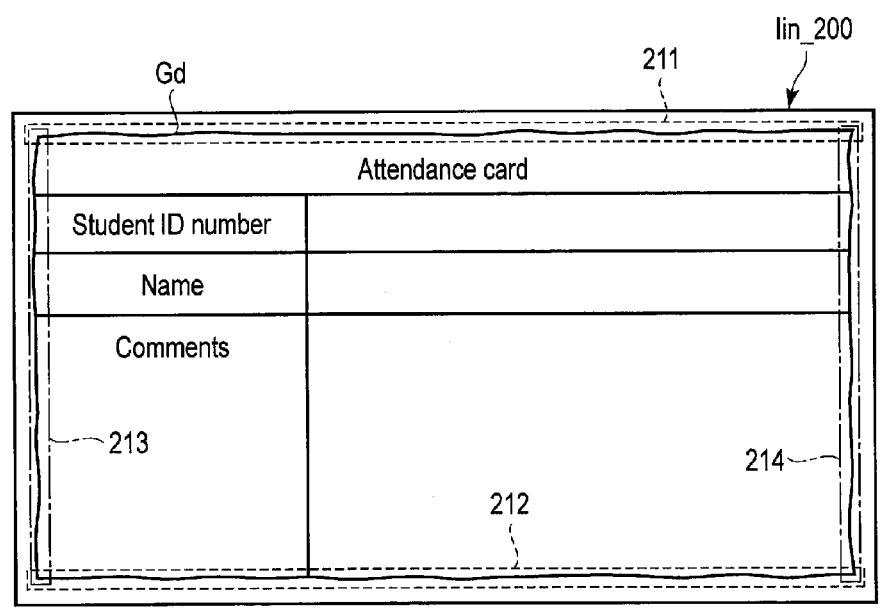
F I G. 21

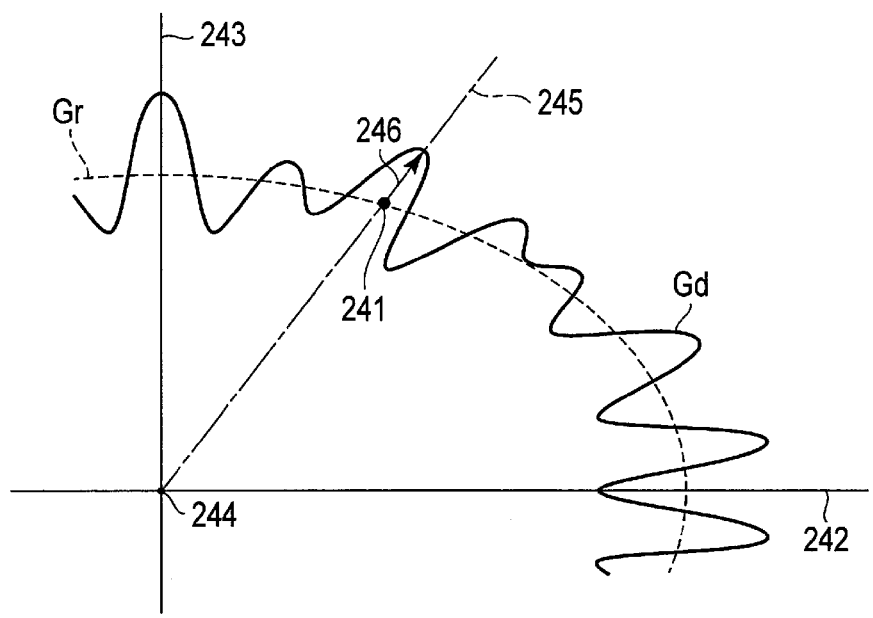
F I G. 24
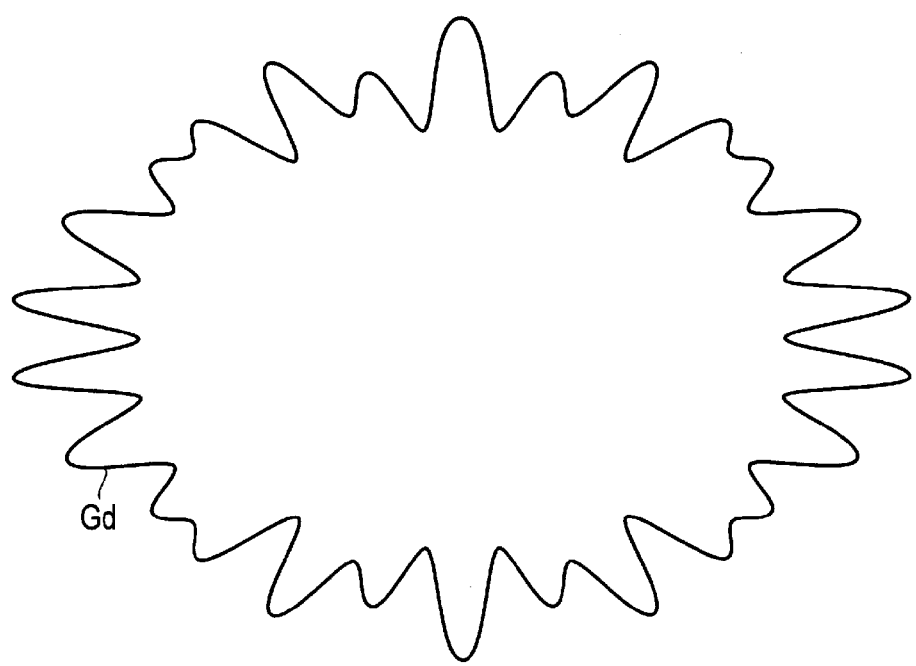
F I G. 25

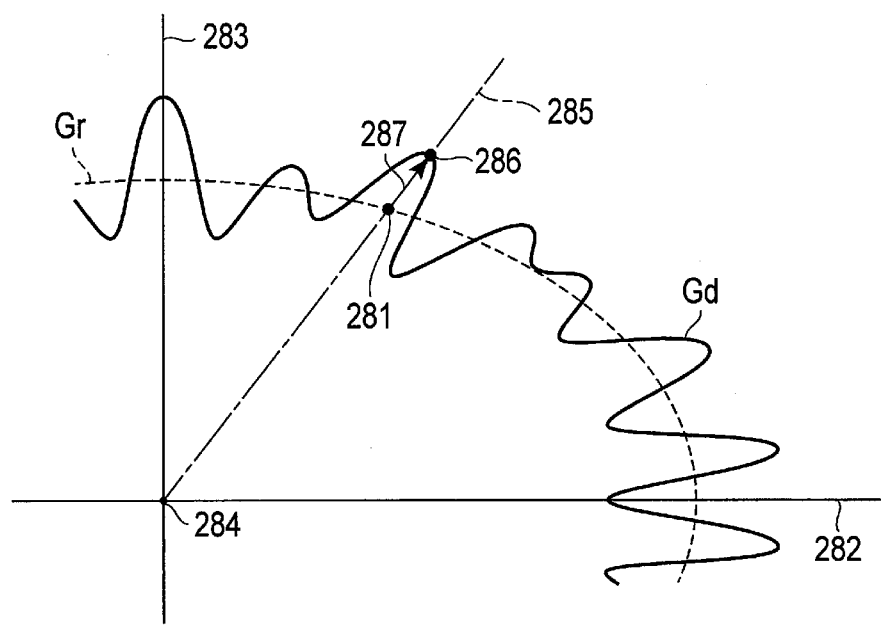
F I G. 28
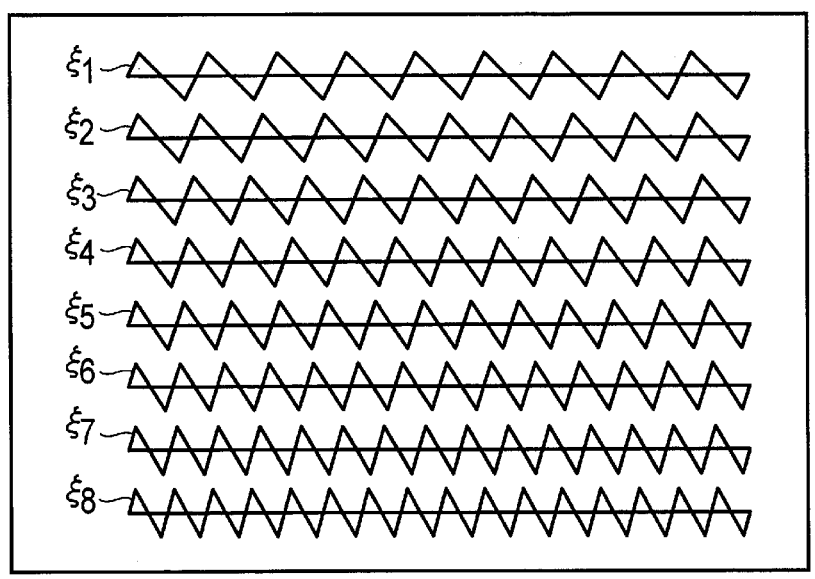
F I G. 29

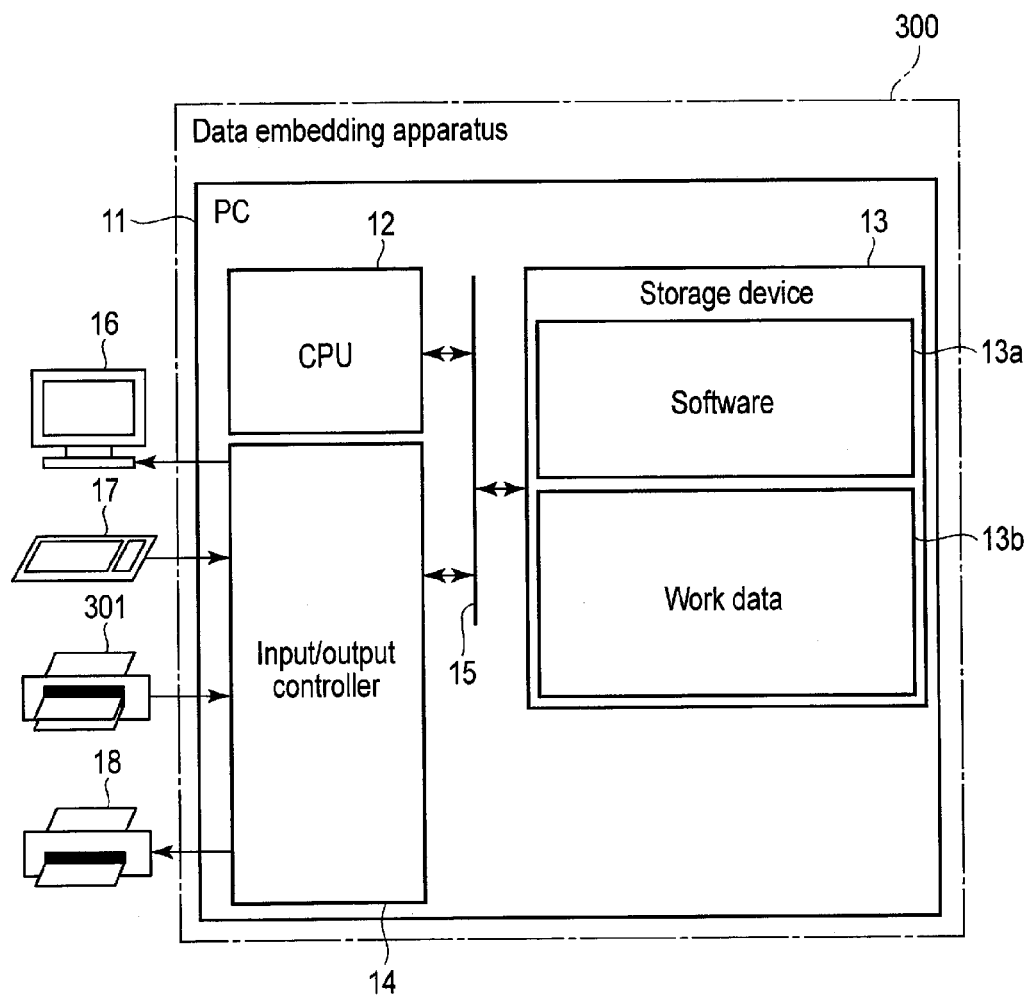
F I G. 30

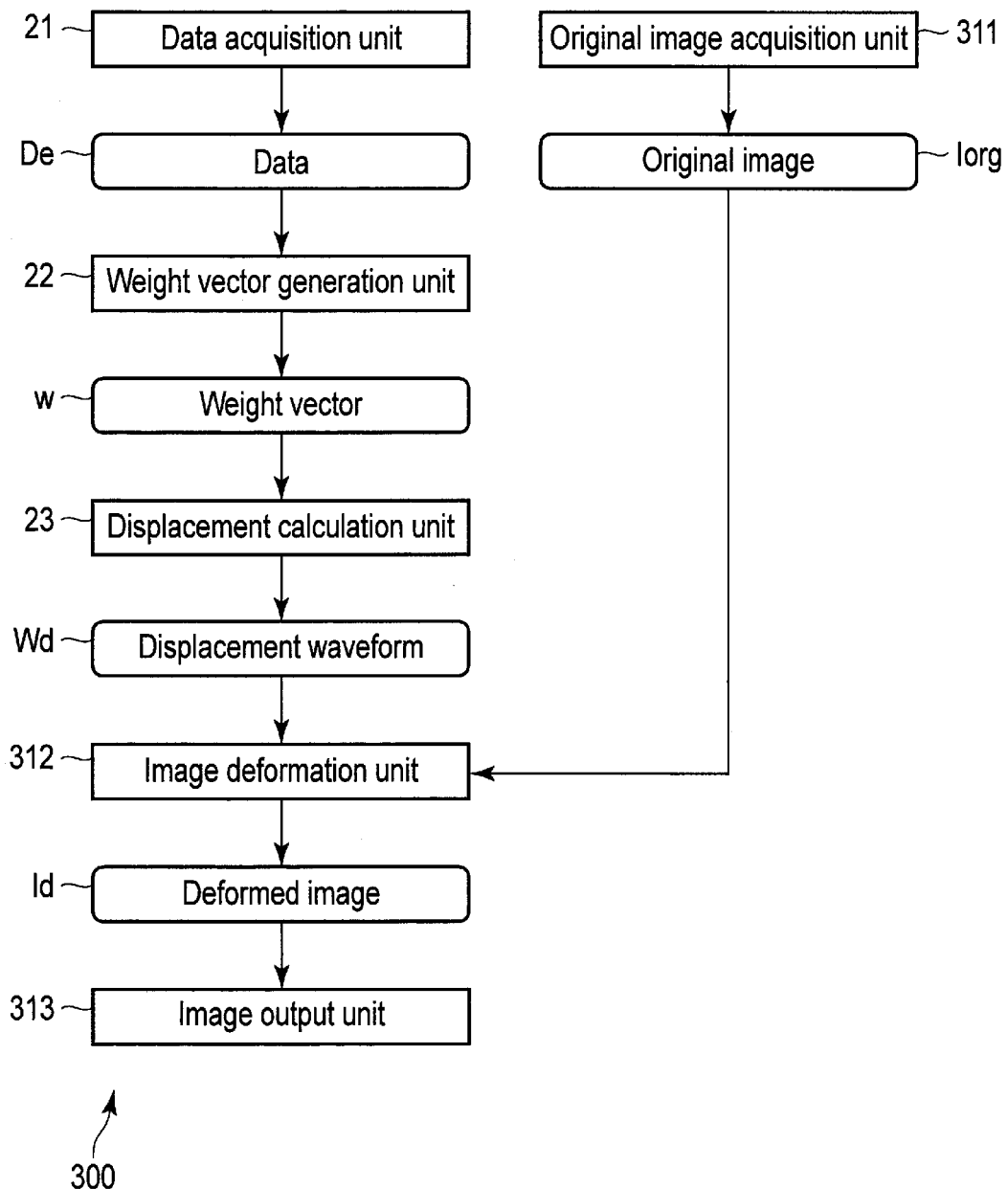
F I G. 31

APPARATUS AND METHOD FOR EMBEDDING DATA IN OBJECT AND APPARATUS AND METHOD FOR EXTRACTING EMBEDDED DATA

CROSS-REFERENCE TO RELATED APPLICATIONS

This application is a Continuation Application of PCT Application No. PCT/JP2012/067225, filed Jul. 5, 2012, the entire contents of which are incorporated herein by reference.

FIELD

Embodiments described herein relate generally to an apparatus and method for embedding data in an object and an apparatus and method for extracting embedded data.

BACKGROUND

Conventionally, barcode printing technologies and barcode decoding technologies are widely used. According to the barcode printing technologies, a barcode is printed on a printing medium such as paper. According to the barcode decoding technologies, a printed barcode is read by an image capturing device such as a scanner or a camera, and the read barcode is decoded.

Various kinds of data embedding technologies are also widely used. These data embedding technologies include technologies of embedding data having the form of a two-dimensional barcode in an object such as an image or a printed product.

The data embedding technologies also include digital watermark technologies of embedding data difficult to visually recognize in the object. Many of the digital watermark technologies use a method of superimposing a dot pattern on the object.

The data embedding technologies also include technologies of encoding data by the arrangement of graphic patterns formed from uneven line segments. These encoding technologies use a method of superimposing the arrangement of the graphic patterns on the object.

A barcode or two-dimensional barcode printed on a printing medium is noticeable. For this reason, the barcode or two-dimensional barcode may spoil the appearance of the printed product.

A digital watermark embedded in an object, for example, a printed product as a dot pattern may also spoil the appearance of the printed product due to the following reason. To extract the dot pattern (that is, digital watermark) from the printed product, the printed product is captured by a camera in general. If defocusing or camera shake occurs at the time of capturing, the image may degrade, and the dot pattern may disappear from the image. To prevent this, the dot pattern needs to be printed so large and clear as not to disappear from the image. For this reason, the digital watermark that should be difficult to visually recognize becomes noticeable, and the confidentiality and appearance may be spoiled. This also applies to a printed product on which the arrangement of graphic patterns is superimposed. The reason is as follows. To extract the arrangement of graphic patterns from the printed product on which the arrangement of graphic patterns are superimposed, each graphic pattern needs to be printed so large and clear as not to disappear in the process of printing and capturing.

It is an object of the present invention to provide an apparatus and method for embedding data in an object and an apparatus and method for extracting embedded data, which can implement data embedding that attains an excellent confidentiality without spoiling the appearance.

BRIEF DESCRIPTION OF DRAWINGS

FIG. 1 is a block diagram showing the typical hardware arrangement of a data embedding apparatus according to the first embodiment.

FIG. 3 is a view showing an example of weight vector generation by a weight vector generation unit according to the first embodiment.

FIG. 4 is a view showing an example of a plurality of encoding bases applied in the first embodiment.

FIG. 5 is a view showing an example of a displacement waveform calculated by a displacement calculation unit in the first embodiment.

FIG. 10 is a block diagram showing the typical functional arrangement of the data extraction apparatus.

FIG. 11 is a view showing an example of an image acquired by an image acquisition unit in the first embodiment.

FIG. 12 is a view showing an example of a line detected from the image by a fitting unit in the first embodiment.

FIG. 15 is a view showing a typical state of inner product vector calculation by an inner product vector calculation unit according to the first embodiment.

FIG. 20 is a view showing an example of a form image including the graphic shown in FIG. 19.

FIG. 21 is a view showing an example of an image acquired by an image acquisition unit and four detection regions in the second embodiment.

FIG. 24 is a view for explaining typical graphic generation by a graphic generation unit according to the third embodiment.

FIG. 25 is a view showing an example of a graphic generated by the graphic generation unit in the third embodiment.

FIG. 28 is a view for explaining typical residual calculation by a residual calculation unit according to the third embodiment.

FIG. 29 is a view showing an example of a plurality of encoding bases applied in the fourth embodiment.

FIG. 30 is a block diagram showing the typical hardware arrangement of a data embedding apparatus according to the fifth embodiment.

FIG. 31 is a block diagram showing the typical functional arrangement of the data embedding apparatus.

FIG. 36 is a view showing an example of weight vector generation by a weight vector generation unit according to the sixth embodiment.

FIG. 37 is a view showing an example of translation vector quantization by a data extraction unit according to the sixth embodiment.

DETAILED DESCRIPTION

Figure 2:
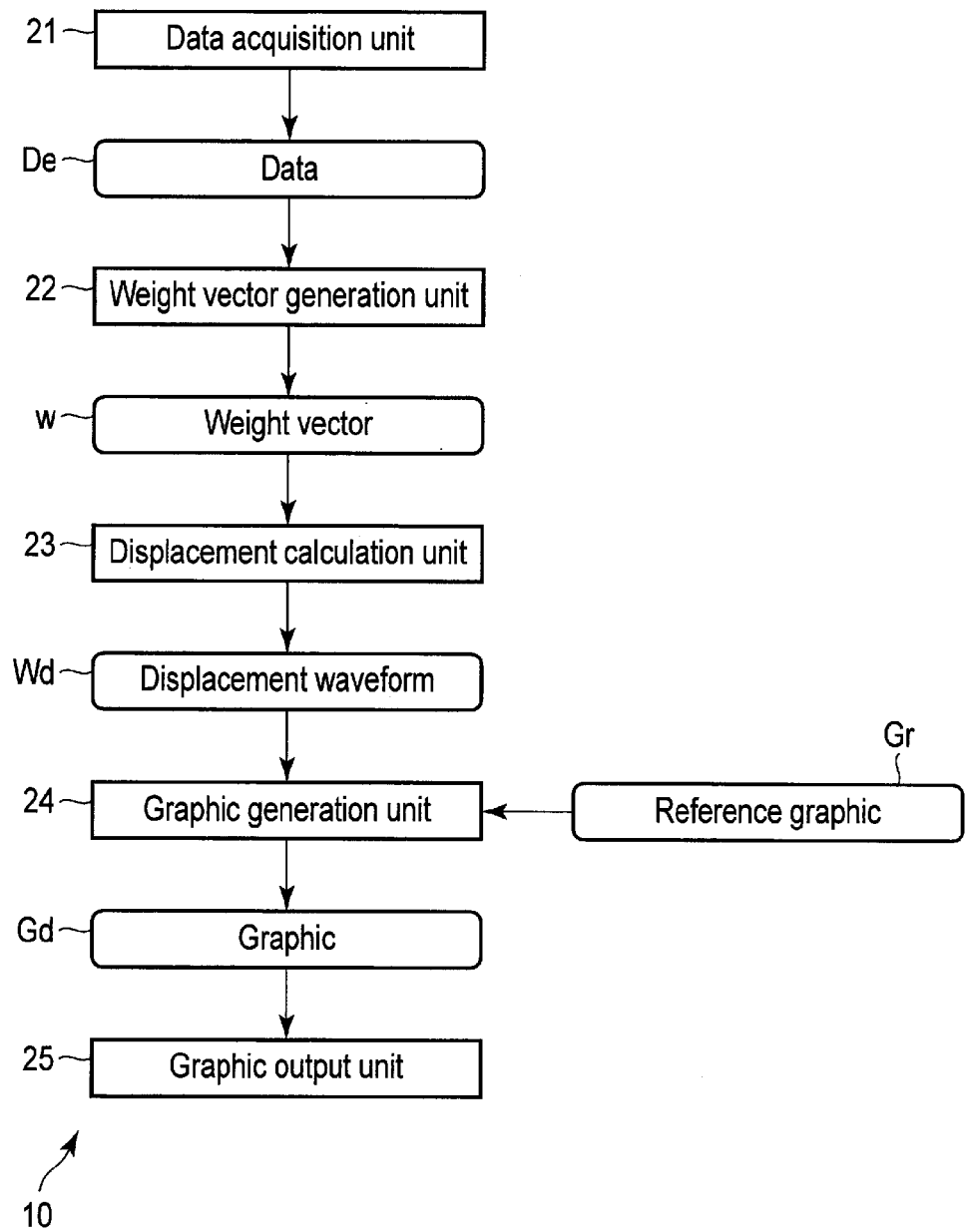
FIG. 2 is a block diagram showing the typical functional arrangement of the data embedding apparatus.

In general, according to one embodiment, a data embedding apparatus includes a data acquisition unit, an object generation unit, and an object output unit. The data acquisition unit is configured to acquire first data formed from a first bit string to be embedded in a first object including one of a first line segment and a first curve. The object generation unit is configured to generate a second object, which includes one of a deformed line segment and a deformed curve having a displacement corresponding to the first bit string with respect to one of the first line segment and the first curve and in which the first data is embedded, by deforming at least one of the first line segment and the first curve of the first object based on the first bit string. The object output unit is configured to output the second object.

The embodiments will now be described with reference to the accompanying drawings.

First Embodiment

FIG. 1 is a block diagram showing the typical hardware arrangement of a data embedding apparatus 10 according to the first embodiment. The data embedding apparatus 10 is implemented using a personal computer (PC) 11. The PC 11 includes a CPU 12, a storage device 13, an input/output controller 14, and a system bus 15. The CPU 12, the storage device 13, and the input/output controller 14 are connected to each other by the system bus 15.

The CPU 12 executes information processing of inputting data De to be embedded in an object such as an image or a printed product and generating an object in which the input data De is embedded. The storage device 13 includes a software area 13a and a work data area 13b. The software area 13a is used to store data embedding software for the information processing. The work data area 13b is used to store work data for the information processing.

The input/output controller 14 is connected to input/output devices, for example, a display 16, a keyboard 17, and a printer 18. The input/output controller 14 inputs/outputs data to/from the display 16, the keyboard 17, and the printer 18.

FIG. 2 is a block diagram showing the functional arrangement of the data embedding apparatus 10. This functional arrangement is implemented by causing the CPU 12 of the PC 11 shown in FIG. 1 to execute the data embedding software. The data embedding apparatus 10 includes a data acquisition unit 21, a weight vector generation unit 22, a displacement calculation unit 23, a graphic generation unit 24, and a graphic output unit 25. In the first embodiment, the data acquisition unit 21, the weight vector generation unit 22, the displacement calculation unit 23, the graphic generation unit 24, and the graphic output unit 25 are formed from software modules. However, some or all of the software modules may be replaced with hardware modules.

The data acquisition unit 21 acquires, via the input/output controller 14 shown in FIG. 1, the data De to be embedded. The data De is formed from a bit string. The weight vector generation unit 22 generates a weight vector w based on the bit string of the data De.

The displacement calculation unit 23 weights, by the elements of the weight vector w, a plurality of predetermined bases (to be referred to as encoding bases hereinafter) for encoding, and calculates a displacement waveform Wd formed from the sum of the weighted bases. The displacement waveform Wd indicates a waveform formed from the series of displacements, that is, the waveform of a displacement.

The graphic generation unit 24 deforms a predetermined reference graphic Gr in the work data area 13b of the storage device 13 based on the displacement waveform Wd. The graphic generation unit 24 thus generates a graphic Gd deformed from the reference graphic Gr. The graphic output unit 25 outputs the graphic Gd or an image including the graphic Gd.

The operation of the data embedding apparatus 10 will be described next. First, the data acquisition unit 21 functions as a user interface to input the data (first data) De to be embedded in an object (first object). In the first and other embodiments, the object in which the data De is to be embedded is formed from reference graphic Gr. The reference graphic Gr includes a line segment.

In the first embodiment, data displayed on the display 16 by the data acquisition unit 21 is edited by a user operation using the keyboard 17. The data acquisition unit 21 inputs (that is, acquires) the edited data as the data De via the input/output controller 14.

Based on the bit string (first bit string) of the data De, the weight vector generation unit 22 generates the weight vector w corresponding to the bit string in the following way. For each bit of the data De, the weight vector generation unit 22 generates, for example, a weight −1 for a bit 0 or a weight +1 for a bit 1. The weight vector generation unit 22 generates the weight vector w formed from the sequence of the weights. That is, the weight vector generation unit 22 converts the bit string of the data De into the weight vector w.

The length of the weight vector w equals the length of the bit string of the data De. Let us denote the length by n, the bit string of the data De by $b_1, \ldots, b_n$, a symbol representing the transposition of a matrix and a vector by T, and the weight vector by $w=(w_1, \ldots, w_n)^T$. In this case, the ith (i=1, . . . , n) element $w_i$ of the weight vector w is represented by $$w_i = \begin{cases} -1 & (bi = 0) \\ +1 & (bi = 1) \end{cases}$$

FIG. 3 shows an example of weight vector generation by the weight vector generation unit 22. In the example of FIG. 3, the bit string of the data De is "01001101", and the length (that is, the number of bits of the data De) n is 8. The weight vector generation unit 22 generates the weight vector w=(−1, +1, −1, −1, +1, +1, −1, +1) based on the bit string "01001101", as indicated by arrows 30 in FIG. 3.

The displacement calculation unit 23 weights, by the elements $w_i$ of the weight vector w, the plurality of encoding bases, and calculates the displacement waveform Wd (more specifically, a vector representing the displacement waveform Wd) formed from the sum of the weighted bases. The number of encoding bases equals the length of the weight vector (that is, the number of bits of the data De). The encoding base is expressed as a vector having a length m. m is an integer equal to or larger than n.

Let us denote the ith (i=n) encoding base by $\xi_i = (\xi_{i,1}, \ldots, \xi_{i,m})^T$, and a matrix formed by arranging the encoding bases in the horizontal direction by $\Xi=(\xi_1, \ldots, \xi_n)$. The displacement waveform Wd is also expressed as a vector having the length m. Let the vector (to be referred to as a displacement vector hereinafter) representing the displacement waveform Wd be denoted $d=(d_1, \ldots, d_m)^T$. Using these symbols, the displacement vector d representing the displacement waveform Wd calculated by the displacement calculation unit 23 is given by $$d = \sum_{i=1}^{n} w_i \xi_i = \Xi w$$

FIG. 4 shows an example of the encoding bases $\xi_i$ (i=1, . . . , n) applied in the first embodiment. In this example, n=8. Referring to FIG. 4, the horizontal axis of the drawing represents the number of an element of the vector representing the encoding base $\xi_i$, and the vertical axis represents the value of the element. Encoding bases $\xi_1$ and $\xi_2$ shown in FIG. 4 are a cosine function having a wave number of 16 and a sine function having a wave number of 16, respectively. Encoding bases $\xi_3$ and $\xi_4$ shown in FIG. 4 are a cosine function having a wave number of 17 and a sine function having a wave number of 17, respectively. Encoding bases $\xi_5$ and $\xi_6$ shown in FIG. 4 are a cosine function having a wave number of 18 and a sine function having a wave number of 18, respectively. Encoding bases $\xi_7$ and $\xi_8$ shown in FIG. 4 are a cosine function having a wave number of 19 and a sine function having a wave number of 19, respectively.

FIG. 5 shows an example of the displacement waveform Wd calculated by the displacement calculation unit 23. Referring to FIG. 5, the horizontal axis of the drawing represents the number j (j=1, . . . , m) of an element of displacement vector d representing the displacement waveform Wd, and the vertical axis represents the value (that is, displacement) of the element.

Note that any vector is usable as the encoding base as long as it is linearly independent. That is, any encoding base such as a sine function, a cosine function, or a vector represented by the linear sum of the functions is usable without departing from the limitation.

The graphic generation unit 24 deforms the reference graphic Gr based on the displacement represented by the displacement waveform Wd. The graphic generation unit 24 thus generates the graphic Gd deformed from the reference graphic Gr.

Figure 6:
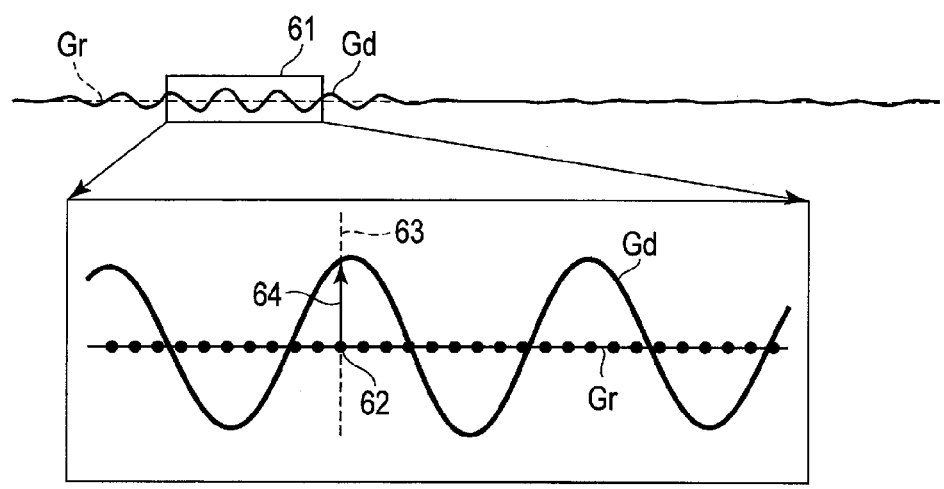
FIG. 6 is a view for explaining typical graphic generation by a graphic generation unit according to the first embodiment.

Details of graphic generation by the graphic generation unit 24 will be described below with reference to FIG. 6. FIG. 6 is a view for explaining typical graphic generation by the graphic generation unit 24. In the first embodiment, the reference graphic Gr is formed from a line segment (first line segment) in the horizontal direction of the drawing, as shown in FIG. 6. FIG. 6 also illustrates an enlarged view of a rectangular region 61 including part of the reference graphic Gr. The reference graphic Gr is stored in the work data area 13b of the storage device 13 and processed in this state.

The graphic generation unit 24 arranges m reference points on the line segment (that is, reference graphic Gr) at equal intervals in correspondence with the m elements of the displacement vector d representing the displacement waveform Wd. The reference points (more specifically, reference points in the rectangular region 61) are indicated by full circles in FIG. 6. FIG. 6 shows a jth reference point 62 as one of the m reference points.

For each of the m reference points, the graphic generation unit 24 acquires a point shifted from the reference point by a displacement corresponding to the value of the element of the displacement vector d representing the displacement waveform Wd. Take the case of the jth reference point 62 shown in FIG. 6 for instance. The graphic generation unit 24 acquires a point shifted by a displacement 64 corresponding to the value of an element $d_j$ of the displacement vector d in the direction of a normal 63 of the line segment (reference graphic Gr) passing through the reference point 62.

The graphic generation unit 24 generates a polygon (or a curve approximated by a polygon) that connects the m acquired points as the graphic Gd in the work data area 13b of the storage device 13. As described above, the graphic generation unit 24 deforms the reference graphic Gr (first line segment) in correspondence with the displacement represented by the displacement waveform Wd based on the displacement vector d representing the displacement waveform Wd, thereby generating the graphic Gd (deformed line segment). That is, the graphic generation unit 24 functions as an object generation unit and increases/decreases the length of the displacement waveform Wd in accordance with the reference graphic Gr, thereby generating an object (second object) formed from the graphic Gd deformed from the reference graphic Gr.

Figure 7:
FIG. 7 is a view showing an example of a graphic generated by the graphic generation unit.

FIG. 7 shows an example of the graphic Gd generated by the graphic generation unit 24. The degree of deformation of the graphic Gd from the reference graphic Gr corresponds to the contents of the bit string of the data De. Hence, the graphic Gd shown in FIG. 7 can be regarded as an object (second object) with the embedded data De.

The graphic output unit 25 outputs the graphic Gd (second object) generated in the work data area 13b of the storage device 13 by the graphic generation unit 24. Here, the graphic output unit 25 is assumed to output the graphic Gd to the printer 18 via the input/output controller 14. In this case, the printer 18 prints the graphic Gd output by the graphic output unit 25 on, for example, a paper surface. However, the graphic output unit 25 may output the graphic Gd to an external storage device via the input/output controller 14 for subsequent information processing. The graphic Gd may be offered for subsequent information processing in the data embedding apparatus 10.

Note that the graphic output unit 25 may output an image such as a form image including the graphic Gd instead of outputting the graphic Gd alone. Such an image is generated by, for example, causing the graphic output unit 25 to composite the graphic Gd with other arbitrary ruled lines, graphics, and characters in the work data area 13b. However, this image may be generated by another device (for example, image generation unit) in the data embedding apparatus 10 or outside the data embedding apparatus 10.

Figure 8:
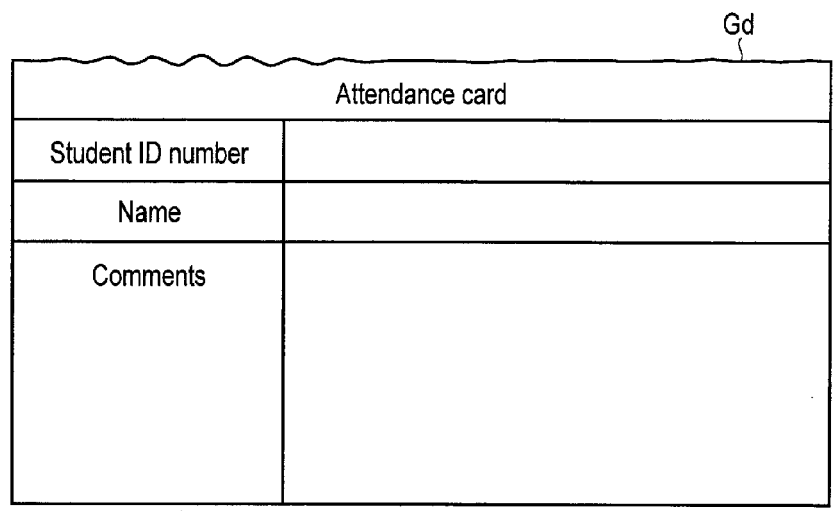
FIG. 8 is a view showing an example of a form image including the graphic shown in FIG. 7.

FIG. 8 shows an example of a form image 80 including the graphic Gd shown in FIG. 7. As is apparent from the example of FIG. 8, the reference graphic. Gr corresponds to the uppermost ruled line of the form. Hence, generating the form image 80 is equivalent to causing the graphic generation unit 24 to, using the uppermost ruled line (that is, the line segment of a predetermined portion) of the original form (that is, reference form) as the reference graphic Gr (first object), deform the reference graphic Gr into the graphic Gd in correspondence with each bit of the data De and generate the graphic Gd (second object).

In the example of the form image 80 shown in FIG. 8, for the descriptive convenience, the amplitude of the waveform representing the shape of the graphic Gd (that is, deformation of the reference graphic Gr shown in FIG. 6) is illustrated extremely large so that the waveform can easily be recognized visually. In fact, however, the amplitude of the waveform of the graphic Gd is so suppressed as not to impede data extraction by a data extraction apparatus 90 (to be described later). In addition, the graphic Gd is not a graphic superimposed on the original form but a graphic generated by deforming a ruled line (reference graphic Gr) of the original form. For this reason, the form image 80 neither largely deviates from the design of the original form and nor gives the user a sense of discomfort. Hence, according to the first embodiment, it is possible to prevent the portion where the data is embedded from being visually recognized and implement data embedding that attains an excellent confidentiality without spoiling the appearance of the form.

Figure 9:
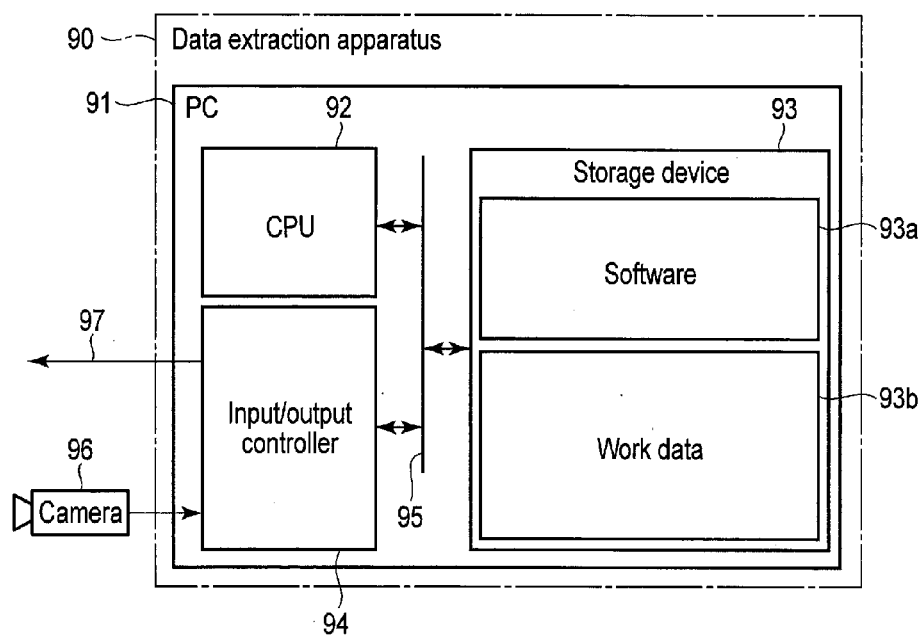
FIG. 9 is a block diagram showing the typical hardware arrangement of a data extraction apparatus according to the first embodiment.

FIG. 9 is a block diagram showing the typical hardware arrangement of the data extraction apparatus 90 according to the first embodiment. The data extraction apparatus 90 according to the first embodiment is implemented using a PC 91. The PC 91 includes a CPU 92, a storage device 93, an input/output controller 94, and a system bus 95. The CPU 92, the storage device 93, and the input/output controller 94 are connected to each other by the system bus 95.

The CPU 92 executes information processing of inputting an image in which the data De is embedded by the data embedding apparatus 10 and extracting data Dd corresponding to the data De from the input image. The storage device 93 includes a software area 93a and a work data area 93b. The software area 93a is used to store data extraction software for the information processing. The work data area 93b is used to store work data for the information processing.

The input/output controller 94 is connected to an image capturing device, for example, a camera 96. The camera 96 is used to acquire an image of an object (for example, printed product) in which the data De is embedded by the data embedding apparatus 10. The input/output controller 94 inputs the image acquired by the camera 96. The input/output controller 94 also outputs extracted data to the outside of the data extraction apparatus 90 via an output interface 97 such as a serial output interface.

FIG. 10 is a block diagram showing the typical functional arrangement of the data extraction apparatus 90. This functional arrangement is implemented by causing the CPU 92 of the PC 91 shown in FIG. 9 to execute the data extraction software. The data extraction apparatus 90 includes an image acquisition unit 101, a fitting unit 102, a residual calculation unit 103, an inner product vector calculation unit 104, a data extraction unit 105, and a data output unit 106. In the first embodiment, the image acquisition unit 101, the fitting unit 102, the residual calculation unit 103, the inner product vector calculation unit 104, the data extraction unit 105, and the data output unit 106 are formed from software modules. However, some or all of the software modules may be replaced with hardware modules.

The image acquisition unit 101 acquires, via the input/output controller 94 shown in FIG. 9, an image Iin including the object (second object) with the embedded data Dd. The fitting unit 102 fits a reference graphic to the image Iin. The residual calculation unit 103 calculates a residual vector r formed from the sequence of residuals of fitting by the fitting unit 102. The residual of fitting will be described later.

The inner product vector calculation unit 104 calculates the inner product between the residual vector r and each of a plurality of predetermined bases (to be referred to as decoding bases hereinafter) for decoding. The inner product vector calculation unit 104 acquires an inner product vector p formed from the sequence of calculated inner products.

The data extraction unit 105 extracts the data (second data) Dd corresponding to the data (first data) De by quantizing a translation vector t corresponding to the inner product vector p. The relationship between the inner product vector p and the translation vector t will be described later. The data output unit 106 outputs the extracted data Dd to the storage device 93 or an external device.

The operation of the data extraction apparatus 90 will be described next. Assume that the camera 96 now acquires, for example, the form image 80 shown in FIG. 8 from a printed product. The data De is embedded by the data embedding apparatus 10 in the form image 80 acquired from the printed product (more specifically, an object formed from the graphic Gd included in the form image 80). The form image 80 acquired by the camera 96 is input to the data extraction apparatus 90 by the input/output controller 94 of the data extraction apparatus 90.

The image acquisition unit 101 acquires, as the image Iin, the form image 80 input by the input/output controller 94. That is, the image acquisition unit 101 acquires the form image 80 with the embedded data De from the camera 96 as the image Iin. In the following explanation of the first embodiment, the acquired image Iin will be referred to as an image Iin_80. The image acquisition unit 101 stores the data of the acquired image Iin_80 in the work data area 93b of the storage device 93 shown in FIG. 9. Note that the image acquisition unit 101 may acquire the image Iin_80 from an image capturing device other than the camera 96, for example, a scanner. The image acquisition unit 101 need not always acquire the image Iin_80 from an image capturing device. The image acquisition unit 101 may acquire the image Iin_80, for example, from a facsimile reception apparatus or via a network using a hypertext transfer protocol (HTTP). That is, the image acquisition unit 101 can use any method as long as it can acquire the image Iin_80 including the object (second object) with the embedded data De.

The fitting unit 102 fits a reference graphic to the image Iin_80 acquired by the image acquisition unit 101. Details of reference graphic fitting by the fitting unit 102 will be described below with reference to FIGS. 11, 12, and 13.

FIG. 11 shows an example of the image Iin_80 acquired by the image acquisition unit 101 in the first embodiment. The image Iin_80 shown in FIG. 11 corresponds to the form image 80 shown in FIG. 8 and therefore includes the graphic Gd. The fitting unit 102 detects a line 121 (see FIG. 12) from a detection region 111 on the image Iin_80 shown in FIG. 11 by, for example, known Hough transform. The detection region 111 is, for example, a rectangular region set at a portion where the graphic Gd in which the data De is embedded by the data embedding apparatus 10 is expected to be printed. That is, the portion where the detection region 111 is set corresponds to the position of the reference graphic Gr used to generate the graphic Gd. The detection region 111 is predetermined by the operator or developer using the format of the set of the coordinates of the four corners (that is, vertices) of the detection region 111 (that is, rectangular region) in the image Iin_80.

Figure 13:
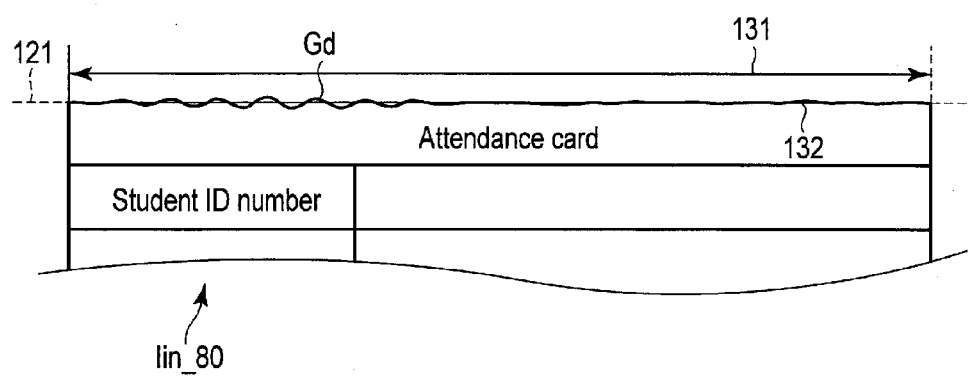
FIG. 13 is a view for explaining typical line segment fitting from the line.

FIG. 12 shows an example of the line 121 detected from the image Iin_80 by the fitting unit 102. FIG. 13 is a view for explaining typical line segment fitting from the line 121. Upon detecting the line 121 shown in FIG. 12, the fitting unit 102 fits a line segment 132 shown in FIG. 13 from the line 121.

In the first embodiment, to fit the line segment 132, a coordinate range 131 shown in FIG. 13 is predetermined. As shown in FIG. 13, the fitting unit 102 fits the line segment 132 within the coordinate range 131 from the line 121. The coordinate range 131 is predetermined by the operator or developer using the format of pairs of coordinates at which the left and right ends of the graphic Gd in which the data De is embedded by the data embedding apparatus 10 are expected to be located.

In the first embodiment in which the image Iin_80 corresponds to the form image 80 shown in FIG. 8, the line segment 132 corresponds to the reference graphic Gr. The fitting unit 102 fits the line segment 132 to the image Iin_80 (more specifically, the graphic Gd in the image Iin_80) using the line segment 132 as the reference graphic. That is, the fitting unit 102 sets the line segment 132 to the position fitted from the line 121. Hence, fitting the line segment 132 to the image Iin_80 is equivalent to fitting the line segment 132 from the line 121 (that is, the line 121 detected from the image Iin_80 by Hough transform). FIG. 13 also shows a state in which the line segment 132 is fitted to the image Iin_80.

The residual calculation unit 103 calculates the residual vector r formed from the sequence of residuals of fitting by the fitting unit 102. The residual of fitting indicates the displacement of the graphic Gd (deformed line segment) in the image Iin_80 from the line segment (first line segment) 132 used as the reference graphic. Details of calculation of the residual vector r by the residual calculation unit 103 will be described below.

The residual calculation unit 103 arranges m reference points (that is, reference points where j=1, . . . , m) at equal intervals on the line segment 132 (that is, reference graphic) fitted to the graphic Gd in the image Iin_80 by the fitting unit 102. The arrangement of the m reference points is the same as the arrangement of the m reference points by the graphic generation unit 24 (see FIG. 6).

Figure 14:
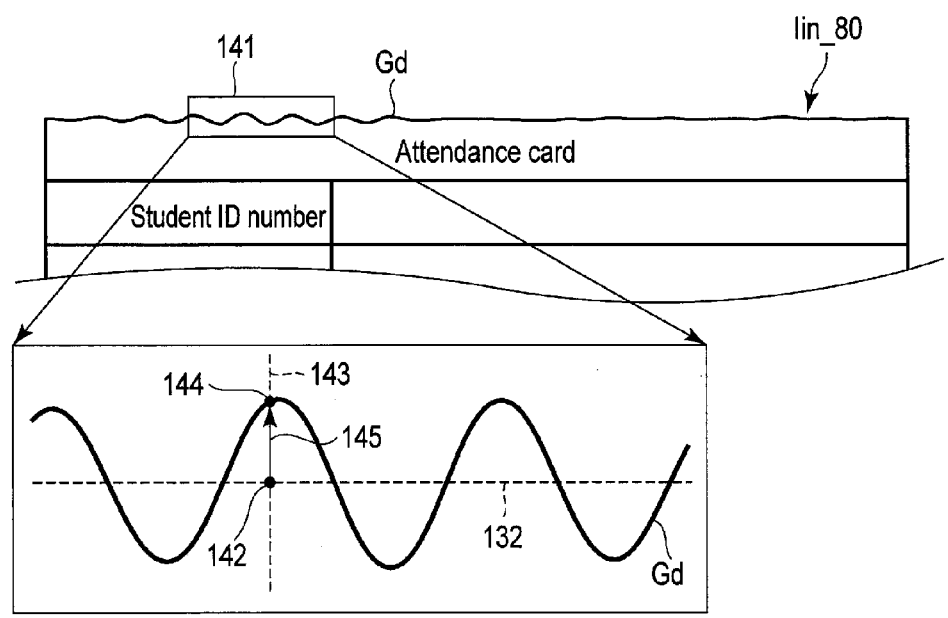
FIG. 14 is a view for explaining typical residual calculation by a residual calculation unit according to the first embodiment.

FIG. 14 is a view for explaining typical residual calculation by the residual calculation unit 103. FIG. 14 also illustrates an enlarged view of a rectangular region 141 including part of the image Iin_80. The jth reference point on the line segment 132 fitted to the image Iin_80 is assumed to be a reference point 142 shown in FIG. 14.

The residual calculation unit 103 detects an edge 144 of the image Iin_80 (more specifically, the graphic Gd in the image Iin_80) on a normal 143 of the line segment 132 at the reference point 142. The residual calculation unit 103 calculates a displacement 145 of the detected edge 144 from the reference point 142 (that is, jth reference point) as a displacement $r_j$ of the reference point 142, and acquires the displacement $r_j$ as the jth residual.

The residual calculation unit 103 executes the residual acquisition as described above for all reference points where j=1, . . . , m. The residual calculation unit 103 arranges the thus acquired displacements $r_j$ of the reference points where j=1, . . . , m in the order of j, thereby generating the residual vector $r=(r_1, \ldots, r_m)^T$. The residual calculation unit 103 stores the residual vector r in the work data area 93b of the storage device 93.

The inner product vector calculation unit 104 calculates the inner product between the residual vector r and each of the plurality of predetermined decoding bases. The inner product vector calculation unit 104 acquires the inner product vector p formed from the sequence of the inner products. That is, the inner product vector calculation unit 104 calculates the inner product vector p formed from the sequence of the inner products between the residual vector r and the plurality of decoding bases.

Let us denote the decoding bases by $\zeta_1, \ldots, \zeta_n$, and the inner product vector by $p=(p_1, \ldots, p_n)^T$. In this case, an element pi (i=1, . . . , n) of the inner product vector p is given by $$p_i = \zeta_i^T r$$

If we denote a matrix formed by arranging the decoding bases $\zeta_1, \ldots, \zeta_n$ in the horizontal direction by $Z=(\zeta_1, \ldots, \zeta_n)$, the inner product vector p can be given by $$p = Z^T r$$

FIG. 15 shows a typical state of calculation of the inner product vector p by the inner product vector calculation unit 104. In the first embodiment, the inner product vector calculation unit 104 uses the same base set as the encoding bases $\xi_1, \ldots, \xi_n$ used by the displacement calculation unit 23 of the data embedding apparatus 10 as the decoding bases $\zeta_1, \ldots, \zeta_n$. That is, the ith (i=1, . . . , n) decoding base $\zeta_i$ used by the inner product vector calculation unit 104 equals the encoding base $\xi_i$. In the example of FIG. 15, n=8, and the inner product vector p is p=(−100, +100, −100, −100, +100, +100, −100, +100).

The data extraction unit 105 quantizes the translation vector t corresponding to the inner product vector p calculated by the inner product vector calculation unit 104. The translation vector t is generated by performing predetermined transformation for the inner product vector p. In the first embodiment, identity mapping is used for this transformation. For this reason, the translation vector t equals the inner product vector p. That is, t=p. Hence, in the example of the inner product vector p shown in FIG. 15, the translation vector t is t=p=(−100, +100, −100, −100, +100, +100, −100, +100).

The data extraction unit 105 extracts data by quantizing the translation vector t. In the first embodiment, the data extraction unit 105 quantizes the translation vector t in the following way. First, the data extraction unit 105 checks whether the ith (i=1, ..., n) element $t_i$ of the translation vector t is positive or negative. If the element $t_i$ is negative, the data extraction unit 105 decides the bit corresponding to the element $t_i$ to 0. Otherwise, the data extraction unit 105 decides the bit corresponding to the element $t_i$ to 1.

The data extraction unit 105 executes the above-described quantization for all elements $t_i$ where i=1, ..., n. The data extraction unit 105 thus extracts the data Dd corresponding to the data De embedded in the image Iin_80. That is, the data extraction unit 105 decodes the data Dd from the image Iin_80.

If we denote the bit string of the extracted data Dd by $b'_1, \ldots, b'_n$, the bit $b'_i$ (i=1, ..., n) is represented by $$b'_i = \begin{cases} 0 (ti < 0) \\ 1 (ti \geq 0) \end{cases}$$

Figures 16, 17:
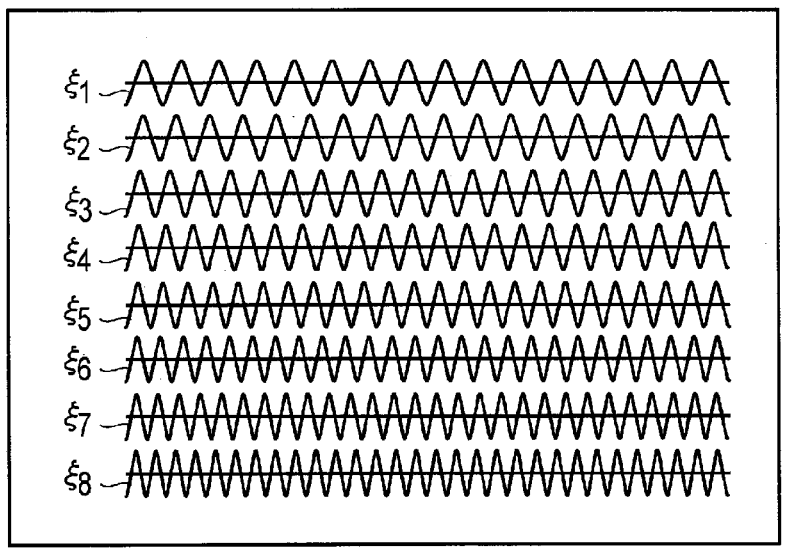
FIG. 16 is a view showing an example of translation vector quantization by a data extraction unit according to the first embodiment.
FIG. 17 is a view showing an example of a plurality of encoding bases applied in the second embodiment.

FIG. 16 is a view showing an example of quantization of the translation vector t by the data extraction unit 105. In the example of FIG. 16, the translation vector t is t=(−100, +100, −100, −100, +100, +100, −100, +100). The data extraction unit 105 quantizes the elements of the translation vector t=(−100, +100, −100, −100, +100, +100, −100, +100) in accordance with the above equation as indicated by arrows 160 in FIG. 16. The data extraction unit 105 thus extracts the data Dd=(0, 1, 0, 0, 1, 1, 0, 1). The data Dd matches the data De (that is, the data De embedded in the image Iin_80).

The data output unit 106 outputs the data De extracted by the data extraction unit 105 to an external device or the storage device 93. That is, the data output unit 106 may transmit the data De to an external device via the input/output controller 94 and the output interface 97. The data output unit 106 may store the data De in the work data area 93b of the storage device 93 and offer it for further information processing.

Second Embodiment

The second embodiment will be described next. As the features of the second embodiment, a reference graphic to be applied is not a line segment (first line segment) but an oblong (rectangle) formed from four line segments including the line segment (first line segment), and encoding bases to be applied are different from those of the first embodiment. Because of these differences, some functions of data embedding software and data extraction software applied in the second embodiment are also different from those applied in the first embodiment. More specifically, the functions of the graphic generation unit, the fitting unit, and the residual calculation unit applied in the second embodiment are different from those in the first embodiment. Except these differences, the data embedding apparatus and the data extraction apparatus applied in the second embodiment are equivalent to those of the first embodiment. The second embodiment will be explained with reference to FIGS. 1, 2, 9, and 10 for convenience.

The operation of a data embedding apparatus 10 according to the second embodiment will be described first. In the second embodiment, the operations of a data acquisition unit 21, a weight vector generation unit 22, and a displacement calculation unit 23 in the data embedding apparatus 10 are the same as in the first embodiment. However, the displacement calculation unit 23 uses cosine functions having wave numbers of 16, 18, 20, 22, 24, 26, and 30 as encoding bases $\xi_1, \xi_2, \xi_3, \xi_4, \xi_5, \xi_6, \xi_7,$ and $\xi_8$, respectively. FIG. 17 shows an example of the encoding bases $\xi_1, \xi_2, \xi_3, \xi_4, \xi_5, \xi_6, \xi_7,$ and $\xi_8$ applied in the second embodiment.

Assume that the displacement calculation unit 23 now calculates a displacement waveform Wd described above using a weight vector w generated based on the bit string of data De and the encoding bases $\xi_1, \ldots, \xi_8$ shown in FIG. 17. A graphic generation unit 24 deforms a reference graphic Gr based on the displacement represented by the displacement waveform Wd, thereby generating a graphic Gd (that is, object formed from the graphic Gd with the embedded data De) deformed from the reference graphic Gr.

Figure 18:
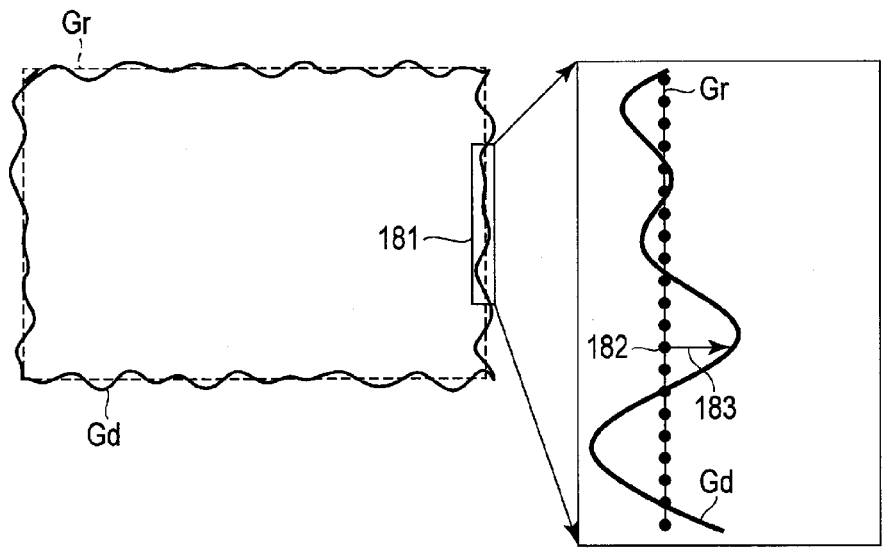
FIG. 18 is a view for explaining typical graphic generation by a graphic generation unit according to the second embodiment.

Details of graphic generation by the graphic generation unit 24 will be described below with reference to FIG. 18. FIG. 18 is a view for explaining typical graphic generation by the graphic generation unit 24 applied in the second embodiment. The reference graphic Gr used in the second embodiment is an oblong indicated by the broken lines in FIG. 18. FIG. 18 also illustrates an enlarged view of a rectangular region 181 including part of the reference graphic Gr.

The graphic generation unit 24 arranges m reference points on the oblong (that is, reference graphic Gr) at equal intervals in correspondence with m elements of a displacement vector d representing the displacement waveform Wd. For example, the m reference points are assumed to be arranged clockwise starting from the upper left corner of the oblong. The reference points (more specifically, reference points in the rectangular region 181) are indicated by full circles in FIG. 18. FIG. 18 shows a jth reference point 182 as one of the m reference points.

For each of the m reference points, the graphic generation unit 24 acquires a point shifted from the reference point by a displacement corresponding to the value of the element of the displacement vector d representing the displacement waveform Wd. In the second embodiment, if the displacement is positive, the point shifted from the reference point is a point outside the oblong. The point outside the oblong is a point shifted from the reference point upward if the side of the oblong on which the corresponding reference point is arranged is the upper side, a point shifted rightward if the side is the right side, a point shifted downward if the side is the lower side, or a point shifted leftward if the side is the left side. Similarly, if the displacement is not positive, the point shifted from the reference point is a point inside the oblong. Take the case of the jth reference point 182 shown in FIG. 18 for instance. The graphic generation unit 24 acquires a point shifted by a displacement 184 corresponding to the value of an element $d_j$ of the displacement vector d in the direction of a normal 183 of the side (here, right side) of the oblong (reference graphic Gr) passing through the reference point 182.

The graphic generation unit 24 generates a polygon that connects the m acquired points as the graphic Gd. The generated polygon can also be regarded as a closed curve.

Figure 19:
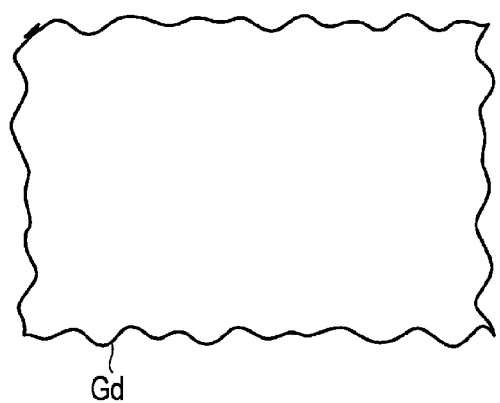
FIG. 19 is a view showing an example of a graphic generated by the graphic generation unit in the second embodiment.

As described above, the graphic generation unit 24 deforms the oblong (reference graphic Gr) in correspondence with the displacement represented by the displacement waveform Wd based on the displacement vector d representing the displacement waveform Wd, thereby generating the graphic Gd. FIG. 19 shows an example of the graphic Gd generated by the graphic generation unit 24 according to the second embodiment. The degree of deformation of the graphic Gd from the reference graphic Gr corresponds to the contents of the bit string of the data De. Hence, the object formed from the graphic Gd shown in FIG. 19 can be regarded as an object (second object) formed from the graphic with the embedded data De.

In the second embodiment, a graphic output unit 25 outputs a form image including the graphic Gd (object formed from the graphic Gd) generated by the graphic generation unit 24 to a printer 18 via an input/output controller 14. FIG. 20 shows an example of a form image 200 including the graphic Gd shown in FIG. 19. In the second embodiment, the form image 200 shown in FIG. 20 is generated by causing the graphic output unit 25 to composite the graphic Gd (second object) with other arbitrary ruled lines, graphics, and characters in a work data area 13b of a storage device 13. The form image 200 may be generated by another device (for example, image generation unit) in the data embedding apparatus 10 or outside the data embedding apparatus 10.

The operation of a data extraction apparatus 90 according to the second embodiment will be described next. Assume that an image acquisition unit 101 acquires the form image (that is, form image including the graphic Gd) 200 shown in FIG. 20 as an image Iin. In the following explanation of the second embodiment, the acquired image Iin will be referred to as an image Iin_200.

A fitting unit 102 fits a reference graphic to the image Iin_200. In the second embodiment, an oblong is applied as the reference graphic. To fit the oblong (that is, reference graphic) to the form image 200, the fitting unit 102 detects the oblong from the form image 200. Details of reference graphic fitting by the fitting unit 102 will be described below with reference to FIGS. 21 and 22.

FIG. 21 shows an example of the image Iin_200 acquired by the image acquisition unit 101 and four detection regions 211, 212, 213, and 214 used to detect the oblong from the image Iin_200 in the second embodiment. The detection regions 211, 212, 213, and 214 are, for example, rectangular regions where the upper, lower, left, and right sides of the oblong (that is, the reference graphic Gr used to generate the graphic Gd) are expected to be located, respectively. Each of the detection regions 211 to 214 is predetermined by the operator or developer using the format of the set of the coordinates of the four corners of the detection region (that is, rectangular region) in the form image 200.

Figure 22:
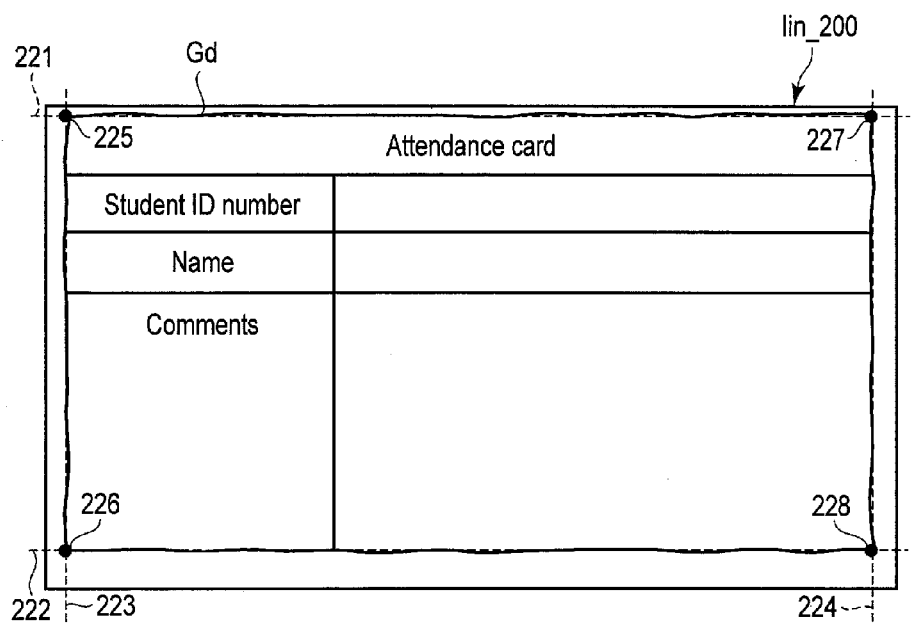
FIG. 22 is a view showing an example of four lines detected by a fitting unit in the second embodiment.

The fitting unit 102 detects lines (line segments) corresponding to the four sides from each of the detection regions 211 to 214 on the image Iin_200 shown in FIG. 21 by, for example, Hough transform. FIG. 22 shows an example of four lines 221, 222, 223, and 224 detected by the fitting unit 102. FIG. 22 also shows an intersection 225 between the lines 221 and 223, an intersection 226 between the lines 222 and 223, an intersection 227 between the lines 221 and 224, and an intersection 228 between the lines 222 and 224.

The fitting unit 10 calculates the coordinates of the intersections 225 to 228 between the lines corresponding to the sides adjacent to each other out of the four sides based on the four detected lines 221 to 224. The calculated coordinates of the intersections 225 to 228 represent the coordinates of the four corners of the oblong. The fitting unit 10 fits the oblong represented by the calculated coordinates of the intersections 225 to 228 to the image Iin_200 as the reference graphic Gr. That is, the fitting unit 102 sets the oblong to a position where the four corners of the oblong match the coordinates of the intersections 225 to 228. Hence, fitting the oblong (that is, reference graphic Gr) to the image Iin_200 is equivalent to detecting the four lines 221 to 224 from the image Iin_200 and calculating the coordinates of the intersections 225 to 228 of the lines 221 to 224.

A residual calculation unit 103 calculates a residual vector r formed from the sequence of residuals of fitting by the fitting unit 102 in the following way. First, the residual calculation unit 103 arranges m reference points (that is, reference points where $j=1, \ldots, m$) at equal intervals on the reference graphic Gr (that is, oblong) fitted to the image Iin_200 by the fitting unit 102. The arrangement of the m reference points is the same as the arrangement of the m reference points by the graphic generation unit 24 (see FIG. 18).

Figure 23:
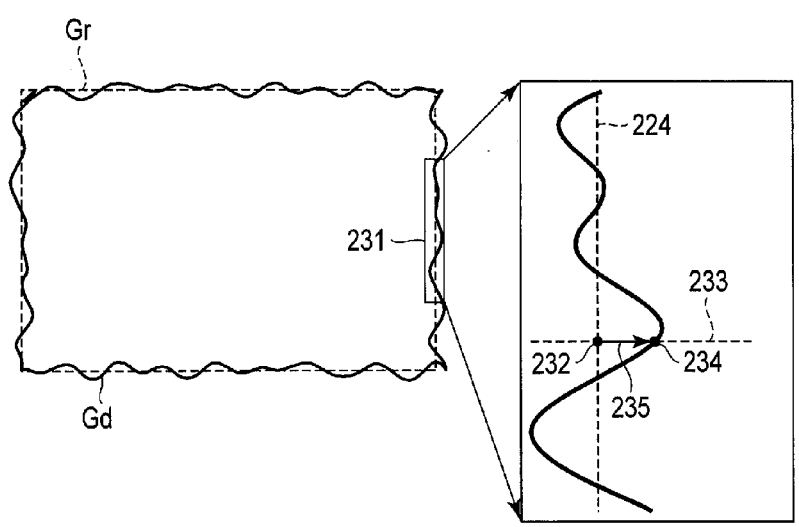
FIG. 23 is a view for explaining typical residual calculation by a residual calculation unit according to the second embodiment.

FIG. 23 is a view for explaining typical residual calculation by the residual calculation unit 103 according to the second embodiment. FIG. 23 also illustrates an enlarged view of a rectangular region 231 including part of the image Iin_200. The jth reference point on the reference graphic Gr (that is, oblong) fitted to the image Iin_200 is assumed to be a reference point 232 shown in FIG. 23.

The residual calculation unit 103 detects an edge 234 of the image Iin_200 (more specifically, the edge 234 of the graphic Gd in the image Iin_200) on a normal 233 of a side (here, right side) of the oblong at the reference point 232. The residual calculation unit 103 calculates a displacement $r_j$ of the detected edge 234 from the reference point 232 (that is, jth reference point), and acquires the displacement $r_j$ as the jth residual. As for the positive/negative of the displacement, the displacement is positive when the edge 234 is located outside the oblong or negative when the edge 234 is located inside, like the displacement handled by the graphic generation unit 24 in the second embodiment.

The residual calculation unit 103 executes the residual acquisition as described above for all reference points where $j=1, \ldots, m$. The subsequent operation is the same as in the first embodiment.

The reference graphic Gr applied in the second embodiment is an oblong. However, as the reference graphic Gr other than a line segment, not only the oblong but any other polygon such as a square, a parallelogram, a triangle, a pentagon, a hexagon, or a star shape is usable. Regardless of which one of the above-described polygons is applied as the reference graphic Gr, it is possible to arrange the reference points on the reference graphic Gr at equal intervals and, for each of the reference points, define a normal at the reference point. For this reason, the graphic generation unit 24 can deform the reference graphic Gr (that is, polygon other than the oblong) by the method applied in the second embodiment and generate an object (second object) formed from the graphic Gd with the embedded data De. Similarly, the residual calculation unit 103 can calculate the residual vector by the method applied in the second embodiment.

Third Embodiment

The third embodiment will be described next. As the features of the third embodiment, a reference graphic to be applied is not a line segment but an ellipse, and encoding bases to be applied are different from those of the first embodiment. Because of these differences, some functions of data embedding software and data extraction software applied in the third embodiment are also different from those applied in the first embodiment. More specifically, the functions of the graphic generation unit, the fitting unit, and the residual calculation unit applied in the third embodiment are different from those in the first embodiment. Except these differences, the data embedding apparatus and the data extraction apparatus applied in the third embodiment are equivalent to those of the first embodiment. The third embodiment will be explained with reference to FIGS. 1, 2, 9, and 10 for convenience.

The operation of the data embedding apparatus according to the third embodiment will be described first. In the third embodiment, the operations of a data acquisition unit 21, a weight vector generation unit 22, and a displacement calculation unit 23 are the same as in the first embodiment. However, the displacement calculation unit 23 uses encoding bases $\xi_1$ to $\xi_8$ shown in FIG. 17, unlike the first embodiment.

Assume that the displacement calculation unit 23 now calculates a displacement waveform Wd described above using a weight vector w generated based on the bit string of data De and the encoding bases $\xi_1, \ldots, \xi_8$ shown in FIG. 17. A graphic generation unit 24 deforms a reference graphic Gr based on the displacement represented by the displacement waveform Wd, thereby generating a graphic Gd (that is, object formed from the graphic Gd with the embedded data De) deformed from the reference graphic Gr.

Details of graphic generation by the graphic generation unit 24 will be described below with reference to FIG. 24. FIG. 24 is a view for explaining typical graphic generation by the graphic generation unit 24 applied in the third embodiment. The reference graphic Gr used in the third embodiment is an ellipse (first curve) indicated by the broken line in FIG. 24. As shown in FIG. 24, the ellipse includes a major axis 242 in the horizontal direction of the drawing and a minor axis 243 in the vertical direction of the drawing.

Using a parameter $\theta$, the coordinates (x, y) of a point on the ellipse are represented by $$(x,y)=(a\cos\theta, a\sin\theta)$$

where a and b are the major radius and the minor radius, respectively, which are predetermined arbitrarily. In addition, $\theta$ falls within the range of $0 \leq \theta \leq 2\pi$. Hence, the values of $\theta$ are 0, $\pi/2$, $\pi$, and $3\pi/2$ at the right, upper, left, and lower ends of the ellipse, respectively.

The graphic generation unit 24 arranges m reference points on the ellipse (that is, reference graphic Gr) at equal intervals in correspondence with m elements of a displacement vector d representing the displacement waveform Wd. For example, the m reference points are assumed to be arranged clockwise starting from the point of $\theta=0$ (that is, right end) on the ellipse. FIG. 24 shows a jth reference point 241 as one of the m reference points.

For each of the m reference points, the graphic generation unit 24 acquires a point shifted from the reference point by a displacement corresponding to the value of the element of the displacement vector d representing the displacement waveform Wd. In the third embodiment, the point shifted from the reference point is a point on a line that connects the reference point and a center 244 of the ellipse (reference graphic Gr) shown in FIG. 24. The center 244 of the ellipse is the intersection between the major axis 242 and the minor axis 243 of the ellipse. The point on the line changes depending on the positive/negative of the displacement. For example, when the displacement is positive, the point is a point shifted from the reference point to the outside of the ellipse. On the other hand, when the displacement is negative, the point on the line is a point shifted from the reference point to the inside of the ellipse.

Acquisition of the point shifted from the reference point will be described in more detail using the case of the jth reference point 241 shown in FIG. 24. The value of $\theta$ at the jth reference point 241 is defined by $$\theta=2\pi j/m$$

The graphic generation unit 24 acquires a point shifted from the reference point 241 by a displacement 246 corresponding to the value of an element $d_j$ of the displacement vector d on a line 245 that connects the reference point 241 and the center 244 of the ellipse. In the example of FIG. 24, the displacement 246 is positive. In this case, the graphic generation unit 24 acquires a point shifted from the reference point 241 by the displacement 246 to the outside of the ellipse (that is, reference graphic Gr) on the line 245.

The graphic generation unit 24 generates a polygon (closed curve) that connects the m acquired points as the graphic Gd (deformed curve). As described above, the graphic generation unit 24 deforms the ellipse (reference graphic Gr) in correspondence with the displacement represented by the displacement waveform Wd based on the displacement vector d representing the displacement waveform Wd, thereby generating the graphic Gd. FIG. 25 shows an example of the graphic Gd generated by the graphic generation unit 24 in the third embodiment. The degree of deformation of the graphic Gd from the reference graphic Gr corresponds to the contents of the bit string of the data De. Hence, the object formed from the graphic Gd shown in FIG. 25 can be regarded as an object (second object) with the embedded data De.

Figure 26:
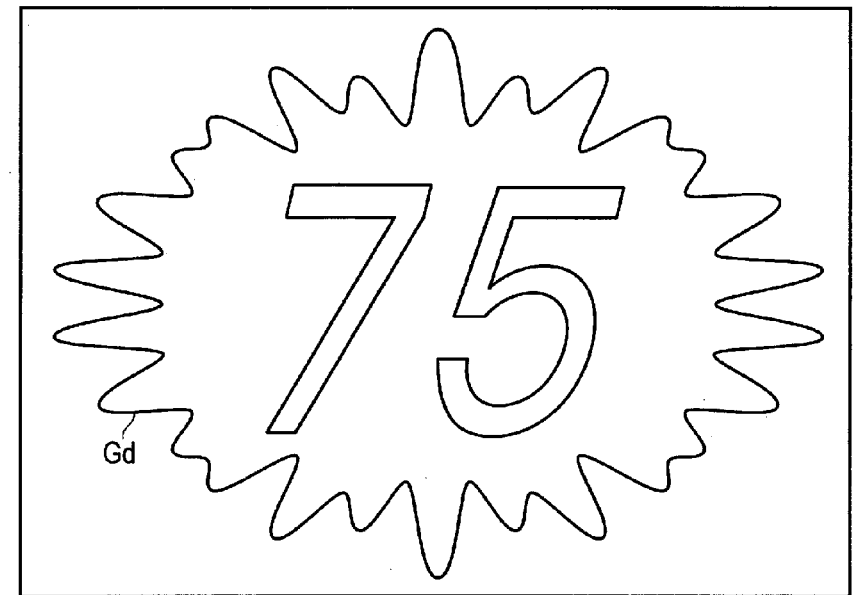
FIG. 26 is a view showing an example of an image including the graphic shown in FIG. 25.

In the third embodiment, a graphic output unit 25 outputs an image including the graphic Gd (object formed from the graphic Gd) shown in FIG. 25, which is generated by the graphic generation unit 24, to a printer 18 via an input/output controller 14. FIG. 26 shows an example of an image 260 including the graphic Gd shown in FIG. 25. In the third embodiment, the image 260 shown in FIG. 26 is generated by causing the graphic output unit 25 to composite the object formed from the graphic Gd with other arbitrary graphics and characters in a work data area 13b of a storage device 13. However, the image 260 may be generated by another device (for example, image generation unit) in a data embedding apparatus 10 or outside the data embedding apparatus 10.

The operation of a data extraction apparatus 90 according to the third embodiment will be described next. Assume that an image acquisition unit 101 acquires the image (that is, image including the graphic Gd) 260 shown in FIG. 26 as an image Iin. In the following explanation of the third embodiment, the acquired image Iin will be referred to as an image Iin_260.

Figure 27:
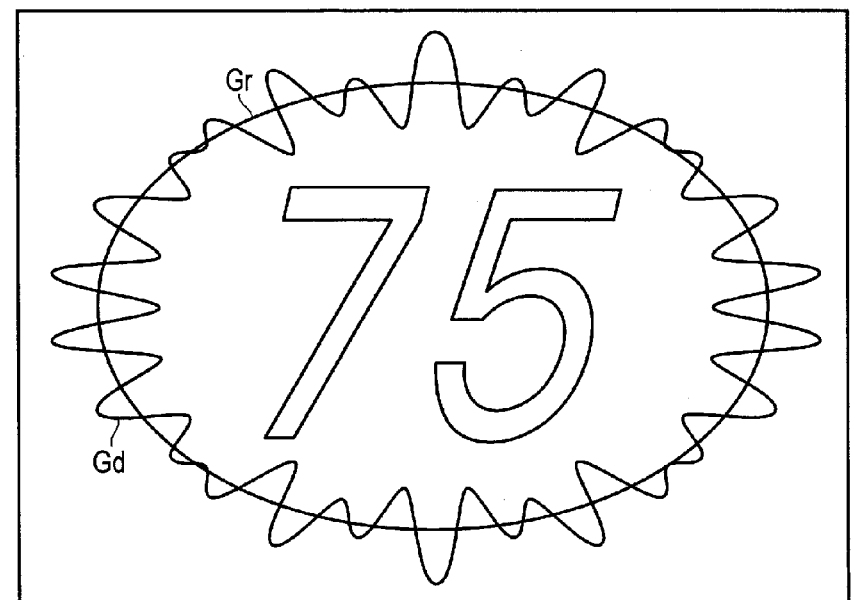
FIG. 27 is a view showing an example in which an ellipse detected from an image is fitted to the image as a reference graphic in the third embodiment.

A fitting unit 102 fits a reference graphic to the image Iin_260. In the third embodiment, an ellipse is applied as the reference graphic. To fit the ellipse (that is, reference graphic) to the image Iin_260, the fitting unit 102 detects the ellipse from the image Iin_260. That is, the fitting unit 102 estimates the parameters (center coordinates, major radius, minor radius, and gradient of major axis) of the ellipse by Hough transform based on the image Iin_260, thereby detecting the ellipse. The fitting unit 102 fits the ellipse (that is, detected ellipse) represented by the estimated parameters to the image Iin_260 as the reference graphic Gr. FIG. 27 shows an example in which the detected ellipse is fitted to the image Iin_260 as the reference graphic Gr.

A residual calculation unit 103 calculates a residual vector r formed from the sequence of residuals of fitting by the fitting unit 102 in the following way. First, the residual calculation unit 103 arranges m reference points (that is, reference points where j=1, . . . , m) at equal intervals on the reference graphic Gr (that is, ellipse) fitted to the image Iin_260 by the fitting unit 102. The arrangement of the m reference points is the same as the arrangement of the m reference points on the ellipse by the graphic generation unit 24.

FIG. 28 is a view for explaining typical residual calculation by the residual calculation unit 103 according to the third embodiment. FIG. 28 shows an jth reference point 281 as one of the m reference points. FIG. 28 also shows a major axis 282, a minor axis 283, and a center 284 of the ellipse.

For each of the m reference points, the residual calculation unit 103 acquires a point shifted from the reference point by a displacement corresponding to the value of the element of the displacement vector d representing the displacement waveform Wd. Take the case of the jth reference point 281 shown in FIG. 28 for instance. The residual calculation unit 103 detects an edge 286 of the image Iin_260 on a line 285 that connects the reference point 281 and the center 284 of the ellipse, that is, the edge 286 of the graphic Gd in the image Iin_260. The residual calculation unit 103 calculates a displacement $r_j$ of the detected edge 286 from the reference point 281 (that is, jth reference point), and acquires the displacement $r_j$ as the jth residual. As for the positive/negative of the displacement, the displacement is positive when the edge 286 is located outside the ellipse or negative when the edge 286 is located inside, like the displacement handled by the graphic generation unit 24 in the third embodiment.

The residual calculation unit 103 executes the residual acquisition as described above for all reference points where j=1, . . . , m. The subsequent operation is the same as in the first embodiment.

The reference graphic Gr applied in the third embodiment is an ellipse. However, as the reference graphic Gr other than a line segment and a polygon, not only the ellipse but any other closed curve such as a circle or an oval is usable. Regardless of which one of the above-described closed curves is applied as the reference graphic Gr, it is possible to arrange the reference points on the reference graphic Gr at equal intervals. The displacement and residual at each of the reference points may be defined either on a line that connects the reference point and the center of the closed curve or on a line in the direction of the normal of the closed curve at the reference point.

Fourth Embodiment

The fourth embodiment will be described next. As the feature of the fourth embodiment, encoding bases to be applied are different from those of the first to third embodiments. Because of this difference, a function (more specifically, a translation vector calculation method) of a data extraction unit applied in the fourth embodiment is different from that in the first to third embodiments. Except these differences, the data embedding apparatus and the data extraction apparatus applied in the fourth embodiment are equivalent to, for example, those of the first embodiment. The fourth embodiment will be explained with reference to FIGS. 1, 2, 9, and 10 for convenience.

In the fourth embodiment, a displacement calculation unit 23 of a data embedding apparatus 10 uses sawtooth waves having different wave numbers as encoding bases $\xi_1, \xi_2, \xi_3, \xi_4, \xi_5, \xi_6, \xi_7$, and $\xi_8$. FIG. 29 shows an example of the encoding bases $\xi_1, \xi_2, \xi_3, \xi_4, \xi_5, \xi_6, \xi_7$, and $\xi_8$ applied in the fourth embodiment.

In the fourth embodiment, an inner product vector calculation unit 104 of a data extraction apparatus 90 uses the same base set as the encoding bases $\xi_1$ to $\xi_8$ shown in FIG. 29 as decoding bases $\zeta_1$ to $\zeta_8$. In this case, the function of a data extraction unit 105 according to the fourth embodiment is different from that of the first embodiment in the following point.

In the first embodiment, the data extraction unit 105 uses identity mapping to transform an inner product vector p into a translation vector t. In the fourth embodiment, however, the data extraction unit 105 uses linear transformation of multiplying the inner product vector p by an inverse matrix $(Z^T\Xi)^{-1}$ of a matrix $Z^T\Xi$ in which the inner products of the encoding bases $\xi_1, \ldots, \xi_n$ (here, n=8) and the decoding bases $\zeta_1, \ldots, \zeta_n$ are arranged. The matrix $Z^T\Xi$ is represented by $$Z^T\Xi = \begin{pmatrix} \zeta_1^T\xi_1 & \cdots & \zeta_1^T\xi_n \\ \vdots & \ddots & \vdots \\ \zeta_n^T\xi_1 & \cdots & \zeta_1^T\xi_n \end{pmatrix} \quad \text{[Mathematical 4]}$$

The reason why the linear transformation is used will be described here. In the first to third embodiments, the displacement calculation unit 23 uses, as the encoding bases $\xi_1, \ldots, \xi_n$, a combination of sine waves whose wave numbers or function types (sine function or cosine function) are different. For this reason, the encoding bases $\xi_1, \ldots, \xi_n$ intersect each other at right angles. Hence, when the inner product vector calculation unit 104 uses the decoding bases of the same combination as the encoding bases, the matrix $Z^T\Xi$ is represented by $$Z^T\Xi = \Xi^T\Xi = \mathrm{diag}(//\xi_1//^2, \ldots, //\xi_n//^2)$$

where $\mathrm{diag}(//\xi_1//^2, \ldots, //\xi_n//^2)$ is a matrix having $//\xi_1//^2, \ldots, //\xi_n//^2$ as diagonal elements.

In this case, for i=1, . . . , n, the inner product vector calculation unit 104 allows a proportional relationship given by $$P = Z^T\xi = \Xi^T\Xi = \mathrm{diag}(//\xi_1//^2, \ldots, //\xi_n//^2)w$$

that is, $$p_i = //\xi_1//^2 w_i$$

to hold. By this proportional relationship, the sign of an element $p_i$ of the inner product vector p is defined by the sign of an element $w_i$ of a weight vector w. Additionally, in the first to third embodiments, data is encoded by the sign of the element $w_i$ of the weight vector w. For this reason, the data extraction unit 105 in the data extraction apparatus 90 can extract a corresponding bit bi of encoded data only by checking the sign of the element $p_i$ $(=t_i)$ of the inner product vector p (=translation vector t).

However, the encoding bases applied in the fourth embodiment include bases that do not intersect at right angles. For this reason, the above-described proportional relationship does not hold between the element $w_i$ of the weight vector w and the element $p_i$ of the inner product vector p.

Hence, in the fourth embodiment, the data extraction unit 105 uses linear transformation to be described below to transform the inner product vector p. That is, the data extraction unit 105 multiplies the inner product vector p by the inverse matrix $(Z^T\Xi)^{-1}$ of the matrix $Z^T\Xi$. A result of the proportional relationship $(Z^T\Xi)^{-1}p$ is represented by $$(Z^T\Xi)^{-1}p = (Z^T\Xi)^{-1}Z^T\Xi w = w$$

Hence, $(Z^T\Xi)^{-1}p$ matches the weight vector w. For this reason, the data extraction unit 105 can easily extract data from $(Z^T\Xi)^{-1}p$.

In the fourth embodiment, the sawtooth waves shown in FIG. 29 are used as the encoding bases. However, as the combination of encoding bases, any base combination is usable as long as bases that are linearly independent from each other are combined. In addition, as the combination of decoding bases, any combination is usable as long as the matrix $Z^T\Xi$ is a regular matrix. Examples of the combination of linearly independent bases include the combination of linear combinations of sine functions and cosine functions as well as the combination of sine functions and cosine functions having different wave numbers used in the first embodiment (see FIG. 4) and the combination of cosine functions having different wave numbers used in the second embodiment (see FIG. 17). As the combination of decoding bases with which the matrix $Z^T\Xi$ (that is, the matrix $Z^T\Xi$ in which the inner products of the encoding bases and the decoding bases are arranged) becomes a regular matrix, the same combination as the encoding bases is usable. As the combination of the encoding bases and the decoding bases, any combination that meets the above-described conditions can be used.

Fifth Embodiment

The fifth embodiment will be described next. As the feature of the fifth embodiment, not a graphic (reference graphic Gr) but an image (original image Iorg) is used as an object in which data De is embedded.

FIG. 30 is a block diagram showing the typical hardware arrangement of a data embedding apparatus 300 according to the fifth embodiment. Note that the same reference numerals as in the hardware arrangement of the data embedding apparatus 10 shown in FIG. 1 denote equivalent elements in FIG. 30. The data embedding apparatus 300 shown in FIG. 30 is implemented using a personal computer (PC) 11, like the data embedding apparatus 10 (see FIG. 1) applied in, for example, the first embodiment (first to fourth embodiments). However, in the fifth embodiment, some functions of data embedding software stored in a software area 13a of a storage device 13 of the PC 11 are different from those in the first embodiment.

On the other hand, a data extraction apparatus applied in the fifth embodiment is almost equivalent to that of, for example, the first embodiment except some functions of data extraction software (more specifically, the functions of a residual calculation unit 103). The data extraction apparatus will be described with reference to FIGS. 9 and 10 for convenience.

An input/output controller 14 of the data embedding apparatus 300 shown in FIG. 30 is connected to not only a display 16, a keyboard 17, and a printer 18 but also a scanner 301. The scanner 301 is used to acquire an image to be used as the original image Iorg from, for example, a printed product. Note that the input/output controller 14 may be connected to an image capturing device other than the scanner 301, for example, a camera.

FIG. 31 is a block diagram showing the typical functional arrangement of the data embedding apparatus 300. The same reference numerals as in the functional arrangement of the data embedding apparatus 10 shown in FIG. 2 denote equivalent elements in FIG. 31. The functional arrangement of the data embedding apparatus 300 is implemented by causing a CPU 12 of the PC 11 shown in FIG. 30 to execute the data embedding software. The data embedding apparatus 300 includes a data acquisition unit 21, a weight vector generation unit 22, and a displacement calculation unit 23, like the data embedding apparatus 10. The data embedding apparatus 300 also includes an original image acquisition unit 311, an image deformation unit 312, and an image output unit 313 in place of the graphic generation unit 24 and the graphic output unit 25 provided in the data embedding apparatus 10. In the fifth embodiment, the data acquisition unit 21, the weight vector generation unit 22, the displacement calculation unit 23, the original image acquisition unit 311, the image deformation unit 312, and the image output unit 313 are formed from software modules. However, some or all of the software modules may be replaced with hardware modules.

The original image acquisition unit 311 acquires the original image Iorg used as an object (first object) in which data De (that is, the data De acquired by the data acquisition unit 21) is to be embedded. The image deformation unit 312 deforms the original image Iorg based on a displacement waveform Wd (that is, the displacement waveform Wd calculated by the displacement calculation unit 23), thereby generating an image Id (second object) deformed from the original image Iorg. The image Id will be referred to as a deformed image Id hereinafter. The image output unit 313 outputs the deformed image Id as an image with the embedded data De.

The operation of the data embedding apparatus 300 according to the fifth embodiment will be described next. The operations of the data acquisition unit 21, the weight vector generation unit 22, and the displacement calculation unit 23 in the data embedding apparatus 300 are the same as those in the data embedding apparatus 10 according to the first embodiment.

Figure 32:
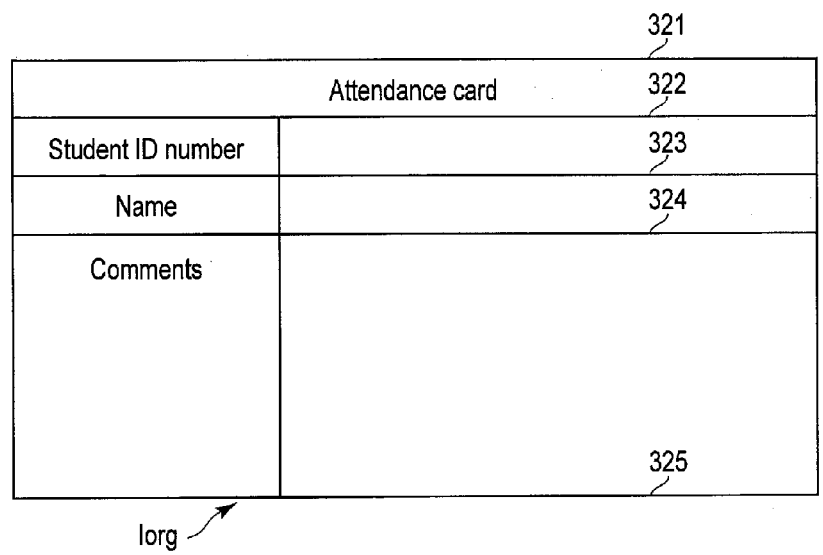
FIG. 32 is a view showing an example of an original image acquired by an original image acquisition unit in the fifth embodiment.

Assume that the displacement calculation unit 23 of the data embedding apparatus 300 now calculates the above-described displacement waveform Wd using a weight vector w generated based on the bit string of the data De and encoding bases $\xi_1, \ldots, \xi_8$ shown in FIG. 17. On the other hand, assume that the scanner 301 acquires the original image Iorg from a printed product on which the original image Iorg is printed. The input/output controller 14 of the data embedding apparatus 300 inputs the original image Iorg acquired by the scanner 301 to the data embedding apparatus 300. The original image acquisition unit 311 acquires the original image Iorg input to the data embedding apparatus 300 and stores it in a work data area 13b of the storage device 13. FIG. 32 shows an example of the original image Iorg. The original image Iorg includes line segments 321 to 325 in the horizontal direction. In the example of FIG. 32, the original image Iorg is a form image, and all the line segments 321 to 325 in the horizontal direction are horizontal ruled lines. The original image Iorg also includes character strings. The line segment 321 corresponds to the reference graphic Gr (first line segment) in the first embodiment.

The image deformation unit 312 of the data embedding apparatus 300 deforms at least part of the original image Iorg based on the displacement represented by the displacement waveform Wd, thereby generating the image Id (that is, the deformed image Id with the embedded data De) deformed from the original image Iorg.

Figure 33:
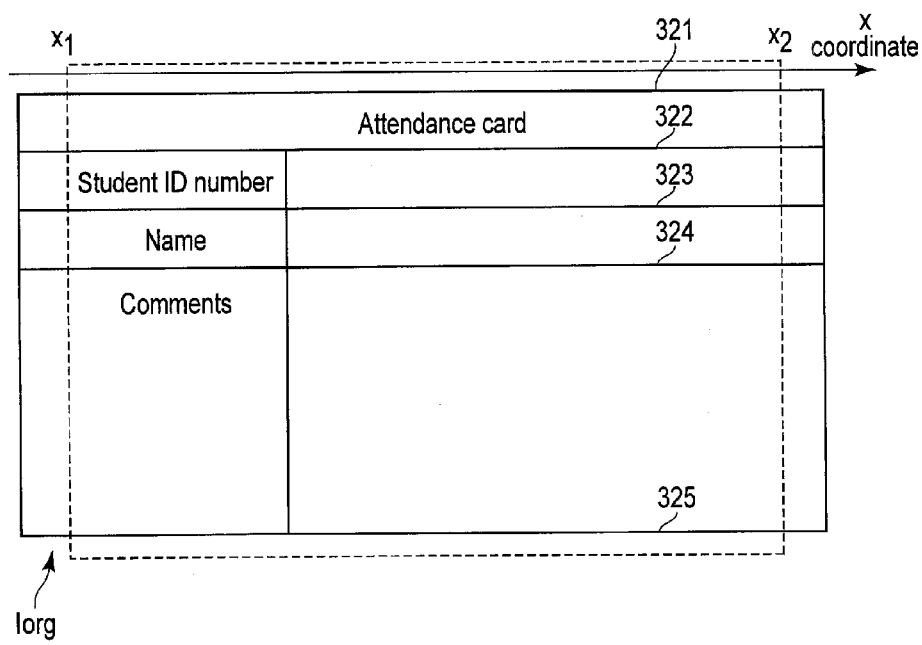
FIG. 33 is a view showing an example of the range of the original image to be deformed by an image deformation unit in the fifth embodiment.

Details of image deformation by the image deformation unit 312 will be described below. FIG. 33 shows an example of the range of the original image Iorg to be deformed by the image deformation unit 312. In the example of FIG. 33, the range is defined by predetermined horizontal coordinates (x coordinates) $x_1$ and $x_2$ ($x_2 > x_1$). That is, a portion of the original image Iorg whose horizontal coordinates x fall within the range of the coordinates $x_1$ to $x_2$ is the range of the original image Iorg to be deformed.

The number of horizontal pixels (width) of the original image Iorg is 1,000. The horizontal coordinate x is represented by a pixel position in the original image Iorg. The upper left corner of the original image Iorg is defined as the origin whose coordinate x is 0. The coordinates $x_1$ and $x_2$ are, for example, 100 and 900, respectively.

In this case, the image deformation unit 312 deforms the portion of the original image Iorg (that is, the original image Iorg in the work data area 13b) whose horizontal coordinates x fall within the range of the coordinate $x_1$=100 to the coordinate $x_2$=900 ($x_1 \le x \le x_2$) based on the values of the elements of a displacement vector d representing the displacement waveform Wd. The portion of the original image Iorg to be deformed includes portions out of the line segments 321 to 325 in the horizontal direction where the horizontal coordinates x on the line segments 321 to 325 fall within the range of the coordinate $x_1$=100 to the coordinate $x_2$=900 ($x_1 \le x \le x_2$). Deformation of the original image Iorg is performed in the following way.

First, the image deformation unit 312 calculates an index j for each value of the coordinate x ($x_1 \le x \le x_2$) on the original image Iorg by $$j = 1 + \text{floor}\left(\frac{(m-1)(x-x_1)}{x_2-x_1}\right)$$

where "floor" in floor( ) represents dropping the fractional portion of the value in the parentheses.

Next, the image deformation unit 312 shifts the corresponding portion (that is, the pixel series of the coordinate x) of the original image Iorg in the work data area 13b in the vertical direction (upward or downward in FIG. 33) by the value (that is, displacement $d_j$) of a jth element $d_j$ of the displacement vector d for each value of the coordinate x. The jth element $d_j$ is represented by the calculated index j. Note that the displacement $d_j$ is represented by the number of pixels.

In the fifth embodiment, if the displacement $d_j$ at the coordinate x is positive, the image deformation unit 312 shifts the whole pixel series of the coordinate x, for example, downward by $d_j$ pixels on the original image Iorg. If the displacement $d_j$ at the coordinate x is negative, the image deformation unit 312 shifts the whole pixel series of the coordinate x upward by $d_j$ pixels on the original image Iorg. The image deformation unit 312 copies the original image Iorg in which the whole pixel series corresponding to each value of the coordinate x is deformed by the displacement $d_j$ to the deformed image Id in another area of the work data area 13b. The image deformation unit 312 thus functions as an object generation unit and generates the deformed image Id (second object) deformed from the original image Iorg (first object) show in FIG. 32 based on the displacement represented by the displacement waveform Wd.

Figure 34:
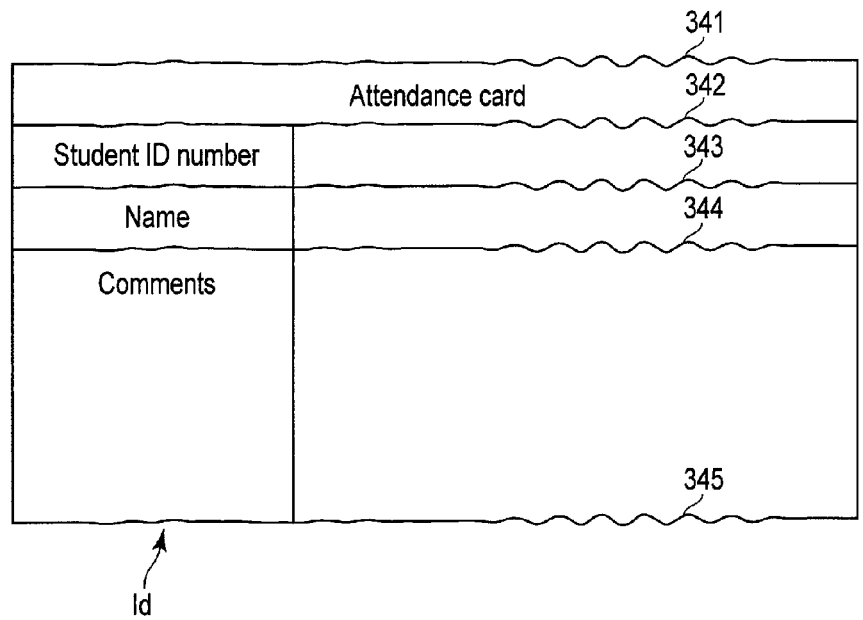
FIG. 34 is a view showing an example of a deformed image generated by deforming an original image portion within the range shown in FIG. 33.

FIG. 34 shows an example of the deformed image Id generated by deforming the portion of the original image Iorg within the range shown in FIG. 33. The deformed image Id includes distorted line segments (to be referred to as deformed line segments hereinafter) 341 to 345. The deformed line segments 341 to 345 correspond to the line segments (ruled lines) 321 to 325 (see FIG. 32) of the original image Iorg. The deformed line segment 341 also corresponds to the graphic Gd in the first embodiment. Note that in the fifth embodiment, the portion of the original image Iorg whose horizontal coordinates x fall within the range ($x_1 \le x \le x_2$) is deformed. Hence, character strings within this range are also deformed. In FIG. 34, however, the state in which the character strings are deformed is not expressed for reasons in drawing.

The degree of deformation of the deformed line segments 341 to 345 in the deformed image Id from the line segments 321 to 325 in the original image Iorg corresponds to the contents of the bit string of the data De. That is, the deformed image Id can be regarded as an image with the embedded data De.

The image output unit 313 outputs the deformed image Id (second object formed from the deformed image Id) generated in the work data area 13b of the storage device 13 by the image deformation unit 312. Here, the image output unit 313 is assumed to output the deformed image Id to the printer 18 via the input/output controller 14. In this case, the printer 18 prints the deformed image Id output by the image output unit 313 on, for example, a paper surface. However, the image output unit 313 may output the deformed image Id to an external storage device via the input/output controller 14 for subsequent information processing. The deformed image Id may be offered for subsequent information processing in the data embedding apparatus 10.

The operation of a data extraction apparatus 90 according to the fifth embodiment will be described next. Assume that the image Id shown in FIG. 34 is acquired by an image acquisition unit 101 as an image Iin.

A fitting unit 102 fits a reference graphic to the image Iin. In the fifth embodiment, a line segment is applied as the reference graphic. To fit the line segment (that is, reference graphic) to the image Iin, the fitting unit 102 detects one or more line segments from the image Iin. Line segment detection from the image Iin will be described below.

Figure 35:
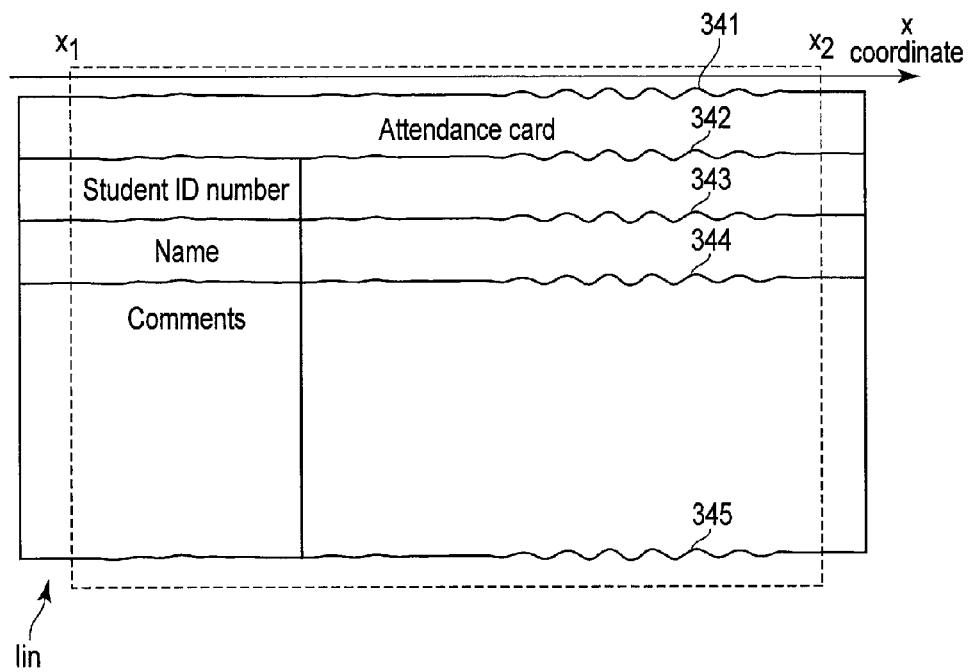
FIG. 35 is a view showing an example of an image acquired by an image acquisition unit and a detection range on the image in the fifth embodiment.

FIG. 35 shows an example of the image Iin and a detection range on the image Iin. The detection range is set on the image Iin to detect one or more line segments from the image Iin. In the example of FIG. 35, letting x be the horizontal coordinate on the image Iin, the detection range is set as a portion on the image Iin whose coordinates x fall within the range of the coordinates $x_1$ to $x_2$ (that is, the range of $x_1 \le x \le x_2$). The detection range matches the range of the original image Iorg to be deformed.

The fitting unit 102 detects a line (line segment) whose length is equal to or more than a threshold $l_{TH}$ from the detection range of $x_1 \le x \le x_2$ of the image Iin shown in FIG. 35 by Hough transform. The threshold $l_{TH}$ is given by $$l_{TH} = c(x_2 - x_1)$$

where c is an arbitrarily predetermined constant, for example, 0.9. Let us denote the number of detected line segments by $n_L$, the detected $n_L$ line segments by $l_1, \ldots, l_{nL}$, and the kth line segment by $l_k$. In the example of the image Iin shown in FIG. 35, $n_L$ is 5, as is also apparent from the example of the original image Iorg shown in FIG. 32. That is, five line segments corresponding to the line segments 321 to 325 shown in FIG. 32 are detected. The fitting unit 102 fits each of the five detected line segments to the image Iin as the reference graphic Gr.

A residual calculation unit 103 calculates a residual vector r formed from the sequence of residuals of fitting by the fitting unit 102. Details of calculation of the residual vector r by the residual calculation unit 103 will be described below.

First, for each element $r_j$ (j=1, ..., m) of the residual vector r, the residual calculation unit 103 calculates a coordinate $x_j$ by $$x_j = x_1 + \frac{j(x - x_1)}{x_2 - x_1}$$

For each of the $n_L$ detected line segments $l_k$ (k=1, ..., $n_L$), the residual calculation unit 103 calculates a residual $r_{k,j}$ of fitting at the coordinate $x_j$. After calculating the residual $r_{k,j}$ of fitting at the coordinate $x_j$ for all of the $n_L$ line segments $l_k$, the residual calculation unit 103 calculates the average value $r_j$ of the residuals $r_{k,j}$ by $$r_j = \frac{1}{n_L} \sum_{k=1}^{n_L} r_{k,j}$$

The residual calculation unit 103 stores the calculated average value $r_j$ in the work data area 13b of the storage device 13 as the jth element of the residual vector r. The residual calculation unit 103 executes the above-described calculation of the residual $r_{k,j}$ and calculation of the average value $r_j$ where j=1, ..., m. The subsequent operation of the data extraction apparatus 90 is the same as in the first embodiment.

In the fifth embodiment, the portion of the original image Iorg within a predetermined range (that is, the range of $x_1 \leq x \leq x_2$) is deformed. However, only lines (line segments) within the range may be deformed. That is, the image deformation unit 312 may detect, for example, all lines (line segments) in the horizontal direction from the portion of the original image Iorg within the range and deform only the detected lines based on the displacement represented by the displacement waveform Wd.

In the fifth embodiment, the original image Iorg is a form image having the line segments 321 to 325 in the horizontal direction. However, the original image Iorg may be an image other than the form image or an image having a curve (closed curve or open curve). In this case, the fitting unit 102 may use a curve detected from the image Iin corresponding to the original image Iorg for the fitting. The image deformation unit 312 may deform, based on the displacement represented by the displacement waveform Wd, a contour line (more specifically, contour line formed from a series of contour pixels) detected from the predetermined range of the original image Iorg.

Sixth Embodiment

The sixth embodiment will be described next. As the feature of the sixth embodiment, the functions of a weight vector generation unit of a data embedding apparatus and a data extraction unit of a data extraction apparatus are different from those in the first embodiment. However, except these differences, the data embedding apparatus and the data extraction apparatus applied in the sixth embodiment are equivalent to those in the first embodiment. The differences between the sixth embodiment and the first embodiment will mainly be explained with reference to FIGS. 1, 2, 9, and 10 for convenience.

The operation of a data embedding apparatus 10 according to the sixth embodiment will be described first. Here, assume that data De acquired by a data acquisition unit 21 is formed from a bit string having a length n'=2n. Let us denote adjacent bits in the bit string having the length n'=2n by $b_{2i}$ and $b_{2i+1}$ (i=1, ..., n). i represents the number of the pair of adjacent bits $b_{2i}$ and $b_{2i+1}$.

A weight vector generation unit 22 converts the pair of adjacent bits $b_{2i}$ and $b_{2n+1}$ (ith bit pair) in the bit string having the length n'=2n into a weight $w_i$ of −3, −1, +1, or +3 by, for example, $$w_i = \begin{cases} -3 & (b_{2i} = 0, b_{2i+1} = 0) \\ -1 & (b_{2i} = 0, b_{2i+1} = 1) \\ +1 & (b_{2i} = 1, b_{2i+1} = 0) \\ +3 & (b_{2i} = 1, b_{2i+1} = 1) \end{cases}$$

The weight vector generation unit 22 sets the weight $w_i$ as the ith element $w_i$ of a weight vector w. That is, the weight vector generation unit 22 converts the ith bit pair into the element $w_i$ of the weight vector w in accordance with the above equation.

The weight vector generation unit 22 executes the above conversion for all bit pairs $b_{2i}$ and $b_{2i+1}$ where i=1, ..., n. The weight vector generation unit 22 thus generates the weight vector w formed from the sequence of the elements $w_i$ where i=1, ..., n. The subsequent operation of the data embedding apparatus 10 is the same as in the first embodiment.

FIG. 36 shows an example of weight vector generation by the above-described weight vector generation unit 22. In the example of FIG. 36, the bit string of the data De is "01001101", as in the first embodiment, and the length n'=2n is 8. That is, n=4. The weight vector generation unit 22 generates the weight vector w=(−1, −3, +3, −1) based on the pairs of adjacent bits in the bit string "01001101", as indicated by arrows 360 in FIG. 36.

The operation of a data extraction apparatus 90 according to the sixth embodiment will be described next. In the sixth embodiment, the operations of an image acquisition unit 101, a fitting unit 102, a residual calculation unit 103, and an inner product vector calculation unit 104 of the data extraction apparatus 90 are the same as in the first embodiment.

Assume that the inner product vector calculation unit 104 acquires an inner product vector p. A data extraction unit 105 quantizes a translation vector t corresponding to the inner product vector p as will be described below. Here, the translation vector t is assumed to equal the inner product vector p, as in the first embodiment.

The data extraction unit 105 quantizes an ith (i=1, ..., n) element $t_i$ of the translation vector t into a closest value $q_i$ out of −3, −1, +1, and +3. That is, if $t_i$ is smaller than −2 ($t_i$<−2), the data extraction unit 105 quantizes $t_i$ into $q_i$=−3. If $t_i$ falls within the range of −2 (inclusive) to 0 (exclusive) (−2≤$t_i$<0), the data extraction unit 105 quantizes $t_i$ into $q_i$=−1. If $t_i$ falls within the range of 0 (inclusive) to +2 (exclusive) (0≤$t_i$<+2), the data extraction unit 105 quantizes $t_i$ into $q_i$=+1. If $t_i$ is +2 or more ($t_i$≥+2), the data extraction unit 105 quantizes $t_i$ into $q_i$=+3.

The data extraction unit 105 executes the above-described quantization for all elements $t_i$ where i=1, ..., n. The data extraction unit 105 thus acquires a quantization result $q_i$ (i=1, ..., n) in which the elements $t_i$ of the translation vector t are quantized.

Next, the data extraction unit 105 determines which one of −3, −1, +1, and +3 is the quantization result $q_i$ corresponding to the element $t_i$. Based on the determination result, the data extraction unit 105 decides the ith pair of bits $b'_{21}$ and $b'_{2i+1}$ corresponding to the element $t_i$ to one of 00, 01, 10, and 11. That is, the data extraction unit 105 decides the pair of bits $b'_{2i}$ and $b'_{2i+1}$ to 00 ($b'_{2i}=0$, $b'_{2i+1}=0$) if $q_i=-3$, or 01 ($b'_{2i}=0$, $b'_{2i+1}=1$) if $q_i=-1$. The data extraction unit 105 decides the pair of bits $b'_{2i}$ and $b'_{2i+1}$ to 10 ($b'_{21}=1$, $b'_{2i+1}=0$) if $q_i=+1$, or 11 ($b'_{21}=1$, $b'_{2i+1}=1$) if $q_i=+3$.

The data extraction unit 105 executes the above-described decision for all quantization results $q_i$ where $i=1, \ldots, n$. The data extraction unit 105 thus extracts data Dd formed from the series of the n pairs of bits $b'_{2i}$ and $b'_{2i+1}$. Note that every time the quantization result $q_i$ corresponding to the ith element $t_i$ is acquired, the data extraction unit 105 may decide the pair of bits $b'_{2i}$ and $b'_{2i+1}$ to one of 00, 01, 10, and 11 based on the quantization result $q_i$.

FIG. 37 is a view showing an example of quantization of the translation vector t by the above-described data extraction unit 105. In the example of FIG. 37, the translation vector t is $t=(-1.2, -3.1, +2.8, -0.9)$. The data extraction unit 105 quantizes elements $t_1=-1.2$, $t_2=-3.1$, $t_3=+2.8$, and $t_4=-0.9$ of the translation vector t into $q_1=-1$, $q_2=-3$, $q_3=+3$, and $q_4=-1$, respectively, as indicated by arrows 371 in FIG. 37. Next, based on $q_1=-1$, $q_2=-3$, $q_3=+3$, and $q_4=-1$, the data extraction unit 105 decides the corresponding bit pairs to 01, 00, 11, and 01, respectively, as indicated by arrows 372 in FIG. 37. The data extraction unit 105 thus extracts the data Dd formed from the series of bit pairs (01001101).

According to at least one embodiment described above, it is possible to provide an apparatus and method for embedding data in an object and an apparatus and method for extracting embedded data, which can implement data embedding that attains an excellent confidentiality without spoiling the appearance.

While certain embodiments of the inventions have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The appended claims and their equivalents are intended to cover such forms or modifications as would fall within the scope and spirit of the inventions.

The invention claimed is:

1. A data embedding apparatus comprising:
 a data acquisition unit configured to acquire first data formed from a first bit string to be embedded in a first object including one of a first line segment and a first curve;
 a weight vector generation unit configured to convert the first bit string into a weight vector;
 a displacement calculation unit configured to calculate a waveform of a displacement by weighting a plurality of encoding bases formed from a plurality of predetermined waveforms by elements of the weight vector;
 an object generation unit configured to generate a second object, which includes one of a deformed line segment and a deformed curve having a displacement corresponding to the first bit string with respect to one of the first line segment and the first curve and in which the first data is embedded, by deforming, by the displacement represented by the waveform of the displacement, at least one of the first line segment and the first curve of the first object based on the first bit string; and
 an object output unit configured to output the second object.

2. The data embedding apparatus according to claim 1, wherein the plurality of encoding bases are formed from one of a combination of sine functions which are linearly independent from each other, a combination of cosine functions which are linearly independent from each other, and a combination of sine functions and cosine functions which are linearly independent from each other.

3. The data embedding apparatus according to claim 1, wherein the first object is formed from an original image including one of the first line segment and the first curve,
 the second object is formed from a deformed image,
 the data embedding apparatus further comprises an image acquisition unit configured to acquire the original image, and
 the object generation unit is configured to generate the deformed image, which has the displacement corresponding to the first bit string with respect to the original image and in which the first data is embedded, by deforming, by the displacement represented by the waveform of the displacement, at least a portion of the original image corresponding to one of the first line segment and the first curve based on the first bit string.

4. A data extraction apparatus comprising:
 an image acquisition unit configured to acquire a first image including a second object in which first data is embedded by a data embedding apparatus of claim 1;
 a fitting unit configured to fit one of a second line segment and a second curve corresponding to one of a first line segment and a first curve to the first image;
 a residual calculation unit configured to calculate a residual vector formed from a sequence of residuals of the fitting representing a displacement based on the displacement of one of a deformed line segment and a deformed curve in the first image from one of the second line segment and the second curve; and
 a data extraction unit configured to extract second data corresponding to the first data based on the residual vector.

5. The data extraction apparatus according to claim 4, wherein the data embedding apparatus further comprises a weight vector generation unit configured to convert a first bit string into a weight vector, and a displacement calculation unit configured to calculate a waveform of the displacement by weighting a plurality of encoding bases formed from a plurality of predetermined waveforms by elements of the weight vector,
 an object generation unit of the data embedding apparatus is configured to deform at least one of the first line segment and the first curve by the displacement represented by the waveform of the displacement,
 the data embedding apparatus further comprises an inner product vector calculation unit configured to calculate an inner product vector formed from a sequence of inner products between the residual vector and a plurality of predetermined decoding bases corresponding to the plurality of encoding bases, and
 the data extraction unit is configured to extract the second data by quantizing a translation vector formed from identity mapping of the inner product vector or acquired by linearly transforming the inner product vector.

6. The data extraction apparatus according to claim 4, wherein the fitting unit is configured to detect one of the second line segment and the second curve from a predetermined range of the first image corresponding to one of the first line segment and the first curve.

7. A data embedding method comprising:

acquiring first data formed from a first bit string to be embedded in a first object including one of a first line segment and a first curve;

converting the first bit string into a weight vector;

calculating a waveform of a displacement by weighting a plurality of encoding bases formed from a plurality of predetermined waveforms by elements of the weight vector;

generating a second object, which includes one of a deformed line segment and a deformed curve having a displacement corresponding to the first bit string with respect to one of the first line segment and the first curve and in which the first data is embedded, by deforming, by the displacement represented by the waveform of the displacement, at least one of the first line segment and the first curve of the first object based on the first bit string; and outputting the second object.

8. A data extraction method comprising: acquiring a first image including a second object in which first data is embedded by a data embedding method of claim 7;

fitting one of a second line segment and a second curve corresponding to one of a first line segment and a first curve to the first image;

calculating a residual vector formed from a sequence of residuals of the fitting representing a displacement based on the displacement of one of a deformed line segment and a deformed curve in the first image from one of the second line segment and the second curve; and extracting second data corresponding to the first data based on the residual vector.

* * * * *